United States Patent
Shim

(10) Patent No.: US 11,055,251 B2
(45) Date of Patent: Jul. 6, 2021

(54) STORAGE DEVICE PERFORMING PEER-TO-PEER COMMUNICATION WITH EXTERNAL DEVICE WITHOUT INTERVENTION OF HOST

(71) Applicant: SAMSUNG ELECTRONICS CO., LTD., Suwon-si (KR)

(72) Inventor: Hojun Shim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/853,373

(22) Filed: Apr. 20, 2020

(65) Prior Publication Data
US 2020/0250121 A1    Aug. 6, 2020

Related U.S. Application Data

(63) Continuation of application No. 16/170,264, filed on Oct. 25, 2018, now Pat. No. 10,628,364.

(30) Foreign Application Priority Data

Nov. 17, 2017   (KR) .......................... 10-2017-0154281
Jul. 9, 2018   (KR) .......................... 10-2018-0079419

(51) Int. Cl.
*G06F 13/40*    (2006.01)
*G06F 3/06*    (2006.01)

(52) U.S. Cl.
CPC ........ *G06F 13/4027* (2013.01); *G06F 3/0613* (2013.01); *G06F 3/0659* (2013.01); *G06F 3/0689* (2013.01); *G06F 13/4068* (2013.01)

(58) Field of Classification Search
CPC ............ G06F 13/4027; G06F 13/4068; G06F 3/0659; G06F 3/0688; G06F 13/4045; G06F 2213/4002; G06F 2213/4004
See application file for complete search history.

(56) References Cited

U.S. PATENT DOCUMENTS

| | | |
|---|---|---|
| 8,812,899 B1 | 8/2014 | Fultz et al. |
| 9,626,264 B2 | 4/2017 | Yeom et al. |
| 9,710,167 B2 | 7/2017 | Liu et al. |
| 9,804,783 B1 | 10/2017 | Bao et al. |
| 10,628,364 B2 * | 4/2020 | Shim ..................... G06F 3/0613 |
| 2013/0159622 A1 | 6/2013 | Cohen |
| 2014/0156934 A1 | 6/2014 | Ohyama |
| 2015/0262633 A1 | 9/2015 | Lee |
| 2017/0091127 A1 | 3/2017 | Khan et al. |
| 2018/0101450 A1 | 4/2018 | Park et al. |

* cited by examiner

*Primary Examiner* — Raymond N Phan
(74) *Attorney, Agent, or Firm* — Sughrue Mion, PLLC

(57) ABSTRACT

A storage device is provided. The storage device includes a field programmable gate array board connected to a first port of the storage device; and a storage controller including a first interface circuit and a second interface circuit. The first interface circuit is connected to the FPGA board, the second interface circuit is connected to a second port of the storage device, at least one port from among the first port and the second port being configured to connect to an external storage device, and the FPGA board is configured to provide a path for transferring data in a peer-to-peer manner between the storage controller and the external storage device without intervention of a host.

10 Claims, 18 Drawing Sheets

STORAGE DEVICE PERFORMING PEER-TO-PEER COMMUNICATION WITH EXTERNAL DEVICE WITHOUT INTERVENTION OF HOST

CROSS-REFERENCE TO RELATED APPLICATIONS

This application a Continuation Application of U.S. application Ser. No. 16/170,264 filed on Oct. 25, 2018, which claims priority under 35 U.S.C. § 119 from Korean Patent Application No. 10-2017-0154281 filed on Nov. 17, 2017 in the Korean Intellectual Property Office and Korean Patent Application No. 10-2018-0079419 filed on Jul. 9, 2018, in Korean Intellectual Property Office, the disclosures of which are incorporated herein by reference in their entireties.

FIELD

Methods and apparatuses consistent with example embodiments relate to an electronic device, and more particularly, to operations and configurations of a storage device which stores and outputs data.

RELATED ART

An electronic device performs its own function according to operations of electronic circuits included the electronic device. The electronic device may perform its own function while operating solely. In some cases, the electronic device may perform its own function while communicating with other electronic device.

A storage device is an example of an electronic device. The storage device may store and output data according to operations of components included in the storage device, and thus may provide a user with a storage service. The storage device may manage data solely, or may manage data while communicating with other electronic device.

In recent years, the volume and type of information distributed has increased sharply and a capacity of the storage device is also increasing to manage the large amount of data. In addition, in order to store a larger amount of data, a plurality of storage devices may be employed together to manage data of a single electronic system. The plurality of storage devices may store and output data while communicating with each other, and may provide a capacity for storing the larger amount of data.

However, an excessive amount of data managed in the plurality of storage devices increased performance of each storage device becomes higher, results in an increased load for managing the storage devices and the data. In particular, when a host system takes full charge of managing the storage devices and the data, a workload of the host system may become heavier.

SUMMARY

The present disclosure may provide a storage device configured to perform peer-to-peer communication with other storage device without intervention of a host.

In some example embodiments, a storage device includes: a field programmable gate array (a FPGA) board connected to a first port of the storage device; and a storage controller including a first interface circuit and a second interface circuit, the first interface circuit being connected to the FPGA board, the second interface circuit being connected to a second port of the storage device. At least one port from among the first port and the second port is configured to connect to an external storage device, and the FPGA board is configured to provide a path for transferring data in a peer-to-peer manner between the storage controller and the external storage device without intervention of a host.

In some example embodiments, a storage device includes a storage controller including a first interface circuit and a second interface circuit, the first interface circuit being connected to a first port of the storage device, and the second interface circuit being connected to a second port of the storage device; and a memory device. The first interface circuit is configured to operate in a plurality of operation modes based on whether the first port is connected to an external device and a type of the external device connected to the first port, and the storage controller is configured to exchange data with an external storage device connected to the first port in a peer-to-peer manner without intervention of a host.

In some example embodiments, a storage device includes a storage controller interposed between a first port of the storage device and a second port of the storage device; and an operation logic circuit configured to generate processed data by performing a processing operation based on data received from the storage controller or the second port. The storage device is configured to, when the first port is connected to an external storage device, output the processed data to the external storage device through the first port without intervention of a host.

In some example embodiments, a storage device includes a storage controller interposed between a first port of the storage device and a second port of the storage device; and a memory device. The storage device is configured to, when the first port is connected to an external storage device, output first data to the external storage device through the first port without intervention of a host, the first data being generated based on at least one from among second data stored in the memory device and third data received through the second port.

In some example embodiments, a storage system includes a first storage device including a first port and a second port; and a second storage device comprising a third port. The second port is connected to the third port, and the first storage device is configured to communicate with the second storage device through the second port and the third port without intervention of a host. The first storage device is configured to output first data through the second port based on at least one data of second data received through the first port and third data stored in the first storage device. The second storage device is configured to generate fourth data based on at least one from among the first data received through the third port and fifth data stored in the second storage device. An operation result corresponding to a request of the host is provided to the host based on the fourth data.

According to the example embodiments, a plurality of storage devices may perform peer-to-peer communication without intervention of a host. Accordingly, even when an amount of data increases and performance of each storage device increases, a load of the host on managing the storage devices and the data may be significantly reduced. This may reduce a design cost and a management cost of the whole electronic system.

BRIEF DESCRIPTION OF THE DRAWINGS

The above and other aspects, features and advantages will become apparent from the following detailed description taken in conjunction with the accompanying drawings in which.

DETAILED DESCRIPTION

Figure 1:
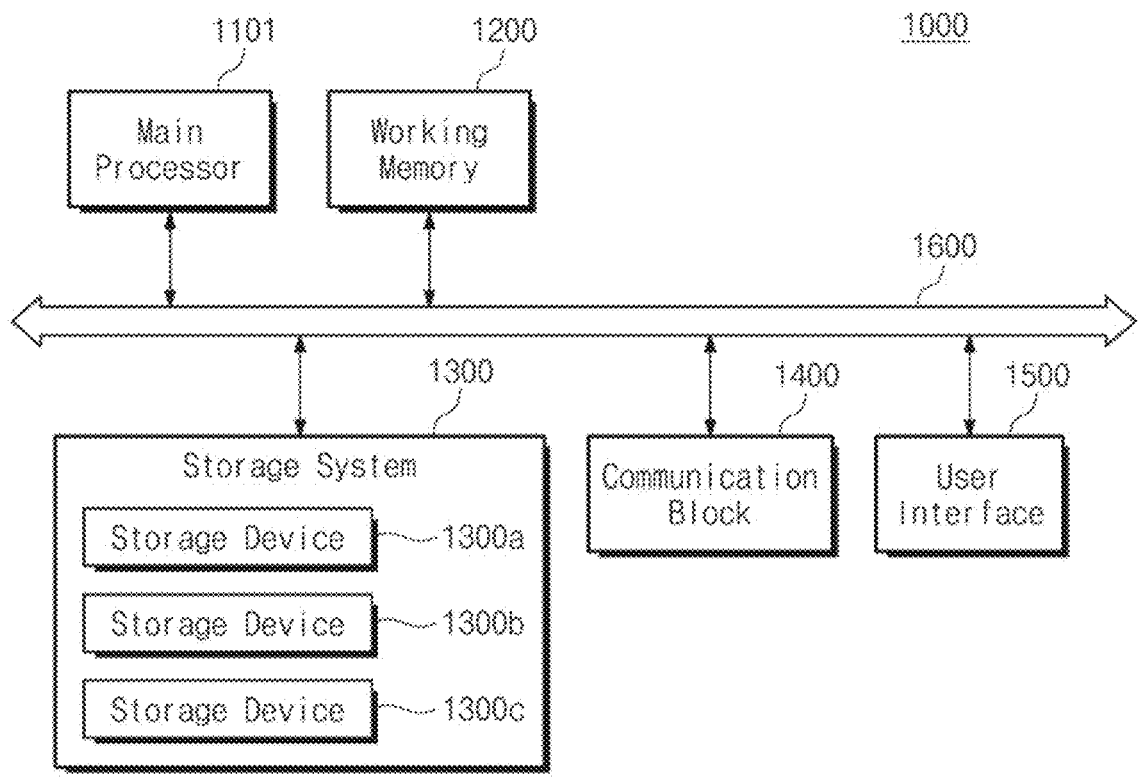
FIG. 1 is a block diagram illustrating an example configuration of an electronic system according to some example embodiments.

FIG. 1 is a block diagram illustrating an example configuration of an electronic system 1000 according to some example embodiments.

The electronic system 1000 may include a main processor 1101, a working memory 1200, a storage system 1300, a communication block 1400, a user interface 1500, and a bus 1600. For example, the electronic system 1000 may be one of electronic devices such as a desktop computer, a laptop computer, a tablet computer, a smart phone, a wearable device, a video game console, a workstation, one or more servers, an electric vehicle, home appliances, a medical device, and/or the like.

The main processor 1101 may control overall operations of the electronic system 1000. For example, the main processor 1101 may be implemented in a general-purpose processor, a special-purpose processor, or an application processor, including one or more processor cores.

The working memory 1200 may store data used in an operation of the electronic system 1000. For example, the working memory 1200 may temporarily store data processed or to be processed by the main processor 1101. For example, the working memory 1200 may include a volatile memory such as a random access memory (RAM), a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage system 1300 may include one or more storage devices. For example, the storage system 1300 may include storage devices 1300a, 1300b, and 1300c. FIG. 1 illustrates three storage devices 1300a, 1300b, and 1300c, but the number of storage devices included in the storage system 1300 may be variously changed or modified to be suitable for requirements of the electronic system 1000.

Each of the storage devices 1300a, 1300b, and 1300c may store data regardless of whether power is supplied. For example, each of the storage devices 1300a, 1300b, and 1300c may include a nonvolatile memory such as a flash memory, a PRAM, an MRAM, a ReRAM, an FRAM, and/or the like. For example, each of the storage devices 1300a, 1300b, and 1300c may include a storage medium such as a solid state drive (SSD), a card storage, or an embedded storage.

The communication block 1400 may support at least one of various wireless/wired communication protocols to communicate with an external device/system of the electronic system 1000. The user interface 1500 may include various input/output interfaces to arbitrate in communication between a user and the electronic system 1000.

The bus 1600 may provide a communication path between components of the electronic system 1000. The components of the electronic system 1000 may exchange data with each other in compliance with a bus format of the bus 1600. For example, the bus format may include one or more of various interface protocols such as universal serial bus (USB), small computer system interface (SCSI), peripheral component interconnect express (PCIe), serial advanced technology attachment (SATA), serial attached SCSI (SAS), nonvolatile memory express (NVMe), universal flash storage (UFS), double data rate (DDR), low power DDR (LPDDR), and/or the like.

Below, example configurations associated with the PCIe protocol and example embodiments associated with the storage devices 1300a, 1300b, and 1300c will be described. However, the example embodiments of the present disclosure may be variously changed or modified to be employed with regard to an interface protocol other than the PCIe protocol. In addition, the example embodiments of the present disclosure may be employed in any electronic device (e.g., the working memory 1200) which is capable of storing and outputting data, as well as the storage devices 1300a, 1300b, and 1300c. The following descriptions are provided to facilitate better understanding, and are not intended to limit the present disclosure.

Figure 2:
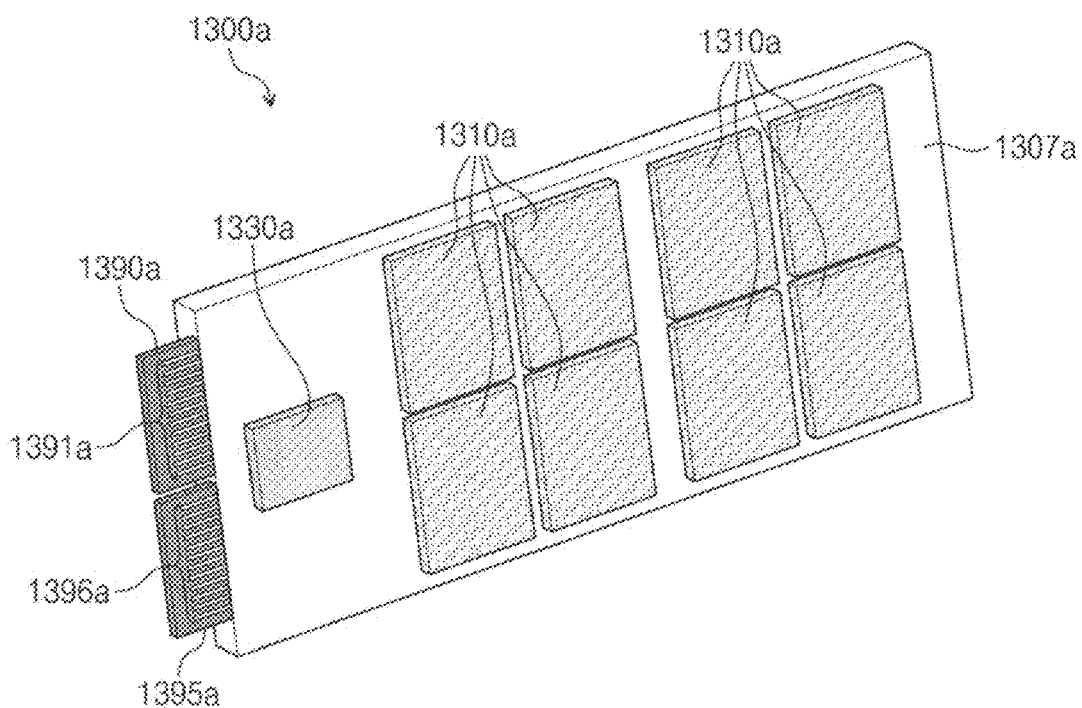
FIG. 2 is a conceptual diagram illustrating an example implementation associated with a storage device of FIG. 1.

FIG. 2 is a conceptual diagram illustrating an example implementation associated with the storage device 1300a of FIG. 1.

In some example embodiments, the storage device 1300a may include a printed circuit board (PCB) 1307a. The storage device 1300a may include one or more chips or packages mounted or equipped on the PCB 1307a. For example, memory devices 1310a and a storage controller 1330a may be mounted or equipped on the PCB 1307a.

The storage controller 1330a may control and manage overall operations of the storage device 1300a. To this end, the storage controller 1330a may include hardware circuits (e.g., an analog circuit, a logic circuit, and/or the like) configured to perform intended operations. Additionally or alternatively, the storage controller 1330a may include one or more processor cores configured to execute an instruction set of a program code for performing intended operations.

The memory devices 1310a may include memories of one or more types. The memory devices 1310a may store or output data under control of the storage controller 1330a. For example, the memory devices 1310a may communicate with the storage controller 1330a through conductive patterns printed on the PCB 1307a.

In some example embodiments, the storage device 1300a may be configured to communicate with other device outside the storage device 1300a through a dual-port. For example, the dual-port of the storage device 1300a may include a first port and a second port, and the storage device 1300a may receive data from another device or output data to another device through the first port and the second port.

For example, when the storage device 1300a is an SSD, the storage device 1300a may be referred to as a dual-port SSD.

For example, the storage device 1300a may include connectors 1390a and 1395a corresponding to the dual-port. The connectors 1390a and 1395a may include pins or patterns 1391a and 1396a formed of a conductive material. For example, each of the connectors 1390a and 1395a may be connected to another device directly or indirectly (e.g., through a conductive line, a cable, and/or the like). In this case, the storage device 1300a may exchange data with other device through the pins or patterns 1391a and 1396a.

For example, the connector 1390a and the pins or patterns 1391a may correspond to the first port, and the connector 1395a and the pins or patterns 1396a may correspond to the second port. For example, the storage controller 1330a may be connected to the pins or patterns 1391a and 1396a through conductive patterns printed on the PCB 1307a. Accordingly, the storage controller 1330a may output or receive data through the first port and the second port.

The first port and the second port may provide independent communication. For example, an operation of outputting or receiving data through the first port may be independent of an operation of outputting or receiving data through the second port.

A configuration of the storage device 1300a (e.g., the number of the memory devices 1310a, arrangement of the memory devices 1310a and the storage controller 1330a, positions and shapes of the connectors 1390a and 1395a, positions and shapes of the pins or patterns 1391a and 1396a, and/or the like) may be variously changed or modified to be different from the configuration illustrated in FIG. 2. The example implementation of FIG. 2 is provided to facilitate better understanding, and is not intended to limit the present disclosure. The storage devices 1300b and 1300c, other storage devices of the storage system 1300, may be configured to be identical or similar to the storage device 1300a.

Figure 3:
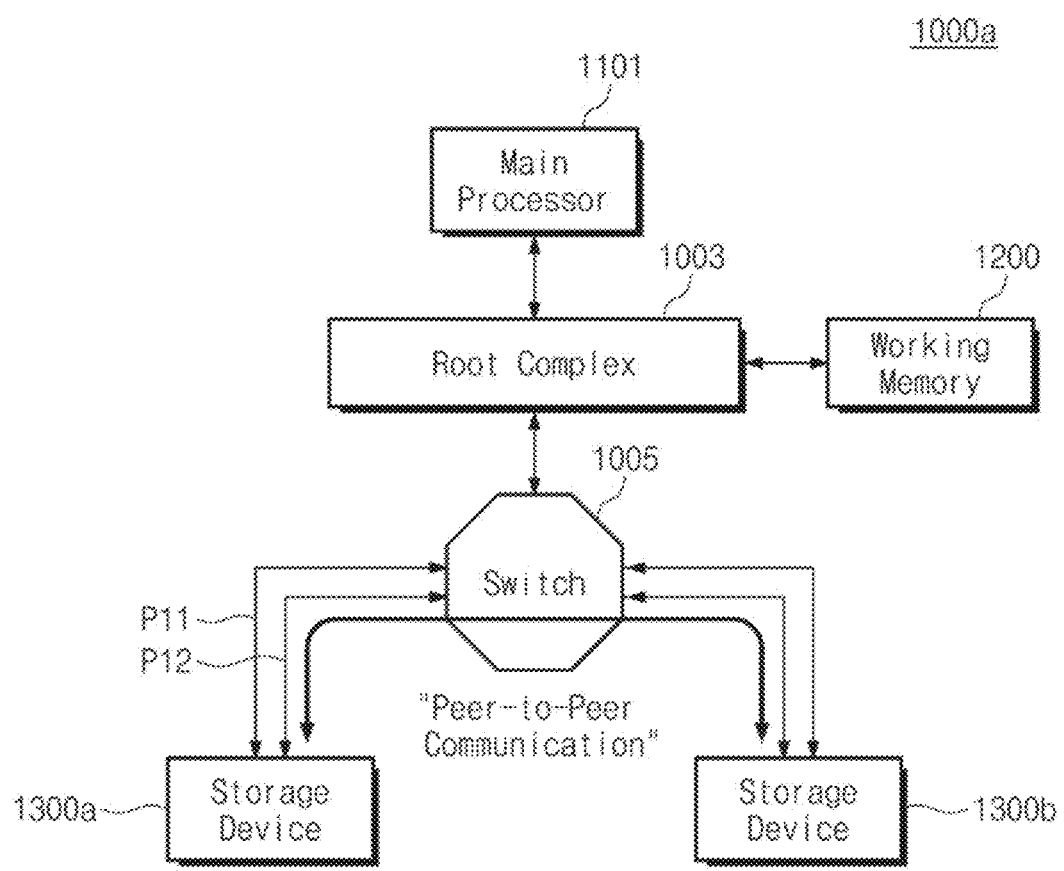
FIGS. 3 and 4 are block diagrams illustrating example configurations associated with an electronic system of FIG. 1.

FIG. 3 is a block diagram illustrating an example configuration 1000a of the electronic system 1000 of FIG. 1.

The configuration 1000a may include the main processor 1101, a root complex 1003, a switch 1005, the working memory 1200, and the storage devices 1300a and 1300b.

The root complex 1003 may manage a data flow between components of the electronic system 1000. For example, the root complex 1003 may control a data path, may schedule a data transfer, or may resolve a communication collision. For example, the main processor 1101, the working memory 1200, and the storage devices 1300a and 1300b may be connected to the root complex 1003, and may exchange data with one another while communicating with one another through the root complex 1003.

In some cases, the switch 1005 may be further connected to the root complex 1003, and the storage devices 1300a and 1300b may be connected to the root complex 1003 through the switch 1005. For example, the switch 1005 may include a PCIe switch or other type of switch. The switch 1005 may control a data path between the root complex 1003 and the storage devices 1300a and 1300b. The root complex 1003 and the switch 1005 may be implemented in a hardware circuit for data control and data transfer.

In some examples, the storage device 1300a may be connected to the switch 1005 through the dual-port. For example, the first port of the storage device 1300a may provide a data path P11 between the storage device 1300a and the switch 1005, and the second port of the storage device 1300a may provide a data path P12 between the storage device 1300a and the switch 1005. Likewise, the storage device 1300b may also be connected to the switch 1005 through a dual-port. Additionally, the storage device 1300c may also be connected to the switch 1005 through a dual-port.

The main processor 1101 may communicate with the storage devices 1300a and 1300b through the root complex 1003 and the switch 1005. In the present disclosure, an object which is capable of accessing components (such as the storage devices 1300a and 1300b) of the electronic system 1000 may be referred to as a "host". The main processor 1101 may be an example of objects which is capable of operating as the host. However, the present disclosure is not limited thereto.

When each of the storage devices 1300a and 1300b communicates with the main processor 1101 through the dual-port, reliability may be improved. For example, even when one port of the storage device 1300a has a failure or is disabled, the other port of the storage device 1300a may support communication.

In the example of FIG. 3, the storage devices 1300a and 1300b may communicate with each other through the switch 1005 in a peer-to-peer manner. In this case, a host (e.g., the main processor 1101) may intervene in communication between the storage devices 1300a and 1300b.

For example, when data is transmitted from the storage device 1300a to the storage device 1300b through the switch 1005, the main processor 1101 may intervene in controlling a data path directed to the storage device 1300b and mapping a memory address. To this end, the main processor 1101 may intervene in processing data exchanged between the storage devices 1300a and 1300b.

Meanwhile, when a capacity of each of the storage devices 1300a and 1300b is large, a large amount of data may be exchanged between the storage devices 1300a and 1300b. In addition, performance of each of the storage devices 1300a and 1300b may be high to manage the large amount of data. In this case, as the host intervenes in processing the data exchanged between the storage devices 1300a and 1300b, a workload of the host may become heavy.

Figure 4:
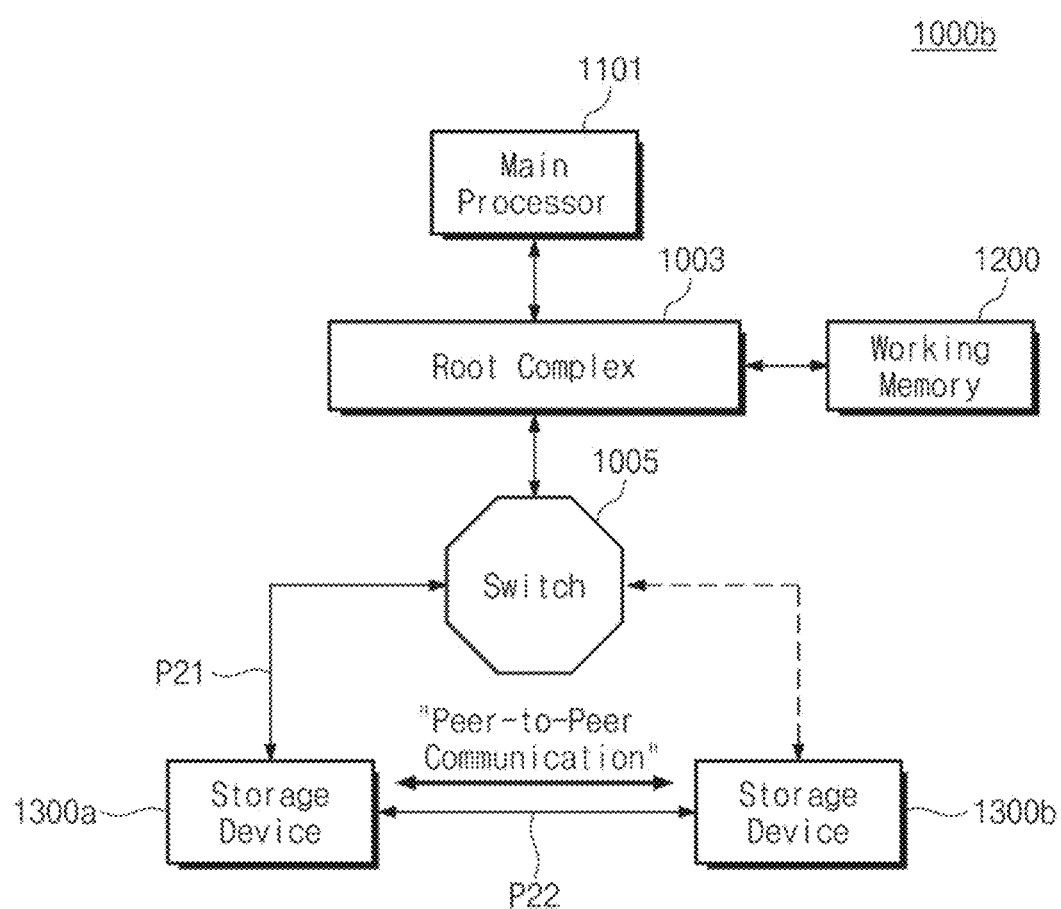

FIG. 4 is a block diagram illustrating an example configuration 1000b associated with the electronic system 1000 of FIG. 1.

The configuration 1000b may include the main processor 1101, the root complex 1003, the switch 1005, the working memory 1200, and the storage devices 1300a and 1300b.

In the configuration 1000b, both the first port and the second port of the storage device 1300a are not connected to the switch 1005. Instead, the first port of the storage device 1300a may be connected to the storage device 1300b, and the second port of the storage device 1300a may be connected to the switch 1005.

For example, the second port of the storage device 1300a may provide a data path P21 between the storage device 1300a and the switch 1005, and the first port of the storage device 1300a may provide a data path P22 between the storage devices 1300a and 1300b. The storage device 1300a may communicate with the main processor 1101 through the data path P21, the switch 1005, and the root complex 1003.

Likewise, one port of the dual-port of the storage device 1300b may be connected to the storage device 1300a. The storage device 1300a may communicate with the storage device 1300b through the data path P22 in the peer-to-peer manner. Additionally, the storage device 1300c may also be connected to the storage device 1300a or 1300b through one port of the dual-port for peer-to-peer communication.

The other port of the dual-port of the storage device 1300b may be connected to the switch 1005 or may not be connected to the switch 1005. When the storage device 1300b is not connected to the switch 1005, the storage device 1300b may communicate with the main processor 1101 through the storage device 1300a. When the storage device 1300b is connected to the switch 1005, the storage device 1300b may communicate with the main processor 1101 through the switch 1005.

In the configuration 1000b, the switch 1005 may not be required in communication between the storage devices 1300a and 1300b. Data exchanged between the storage devices 1300a and 1300b may be processed by the storage device 1300a and/or the storage device 1300b. The host (e.g., the main processor 1101) may not intervene at all in processing the data exchanged between the storage devices 1300a and 1300b (or may minimally intervene in processing the data).

All or some of data processing operations performed by the host in the configuration 1000a may be performed by the storage devices 1300a and 1300b in the configuration 1000b. Accordingly, in the configuration 1000b, even when an amount of the data exchanged between the storage devices 1300a and 1300b increases and performance of the storage devices 1300a and 1300b becomes high, workload of the host may be significantly reduced. This may reduce a design cost and a management cost of the whole electronic system 1000.

FIG. 4 illustrates that the storage device 1300a is connected to the switch 1005. In some example embodiments, the storage device 1300a may be connected to the root complex 1003 without the switch 1005. The electronic system 1000 may be variously changed or modified to be different from the configuration 1000b.

Figure 5:
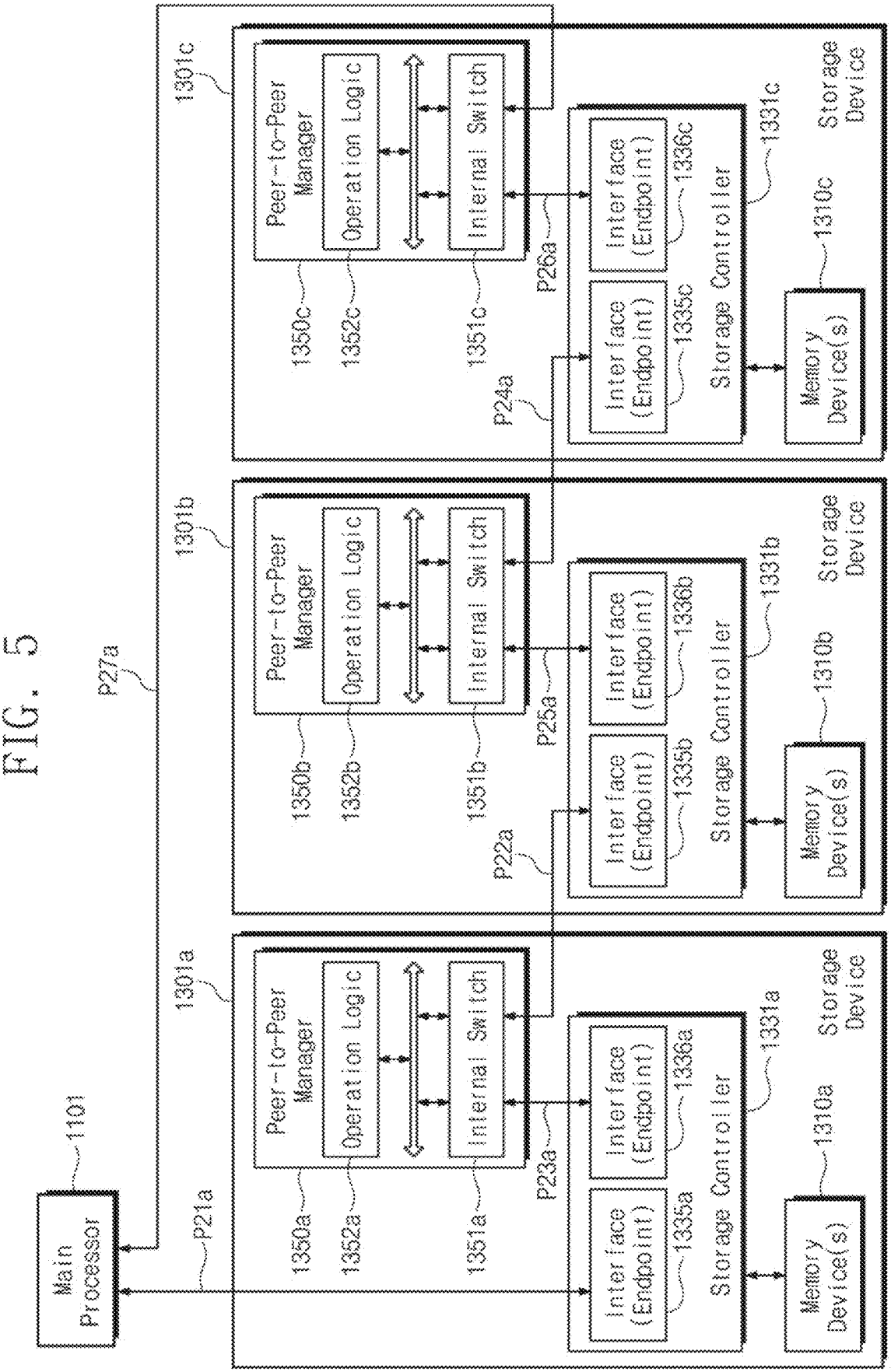
FIG. 5 is a block diagram illustrating an example configuration associated with storage devices of FIG. 1.

FIG. 5 is a block diagram illustrating an example configuration associated with the storage devices 1300a, 1300b, and 1300c of FIG. 1.

In some example embodiments, the storage devices 1300a, 1300b, and 1300c may include storage devices 1301a, 1301b, and 1301c respectively. Similarly to those described with reference to FIG. 4, the storage devices 1301a, 1301b, and 1301c may be connected to each other without the root complex 1003 or the switch 1005, to communicate in a peer-to-peer manner. To this end, each of the storage devices 1301a, 1301b, and 1301c may be implemented in a dual-port structure.

FIG. 5 illustrates that the storage devices 1301a and 1301c are directly connected to the main processor 1101. However, in some example embodiments, the root complex 1003 and/or the switch 1005 may be provided between the storage devices 1301a and 1301c and the main processor 1101. In the present disclosure, a connection to the main processor 1101 may include a direct connection (e.g., without the root complex 1003 and the switch 1005) and an indirect connection (e.g., with the root complex 1003 and/or the switch 1005).

The storage device 1301a may include at least one memory device 1310a, a storage controller 1331a, and a peer-to-peer manager 1350a. The storage controller 1331a may correspond to the storage controller 1330a. The storage controller 1331a may control and manage overall operations of the storage device 1301a. The memory device 1310a may store or output data under control of the storage controller 1331a.

The storage controller 1331a may include interface circuits 1335a and 1336a. Each of the interface circuits 1335a and 1336a may include a physical layer and/or a logical layer configured to transmit/receive and process data, a signal, and/or a packet to facilitate the storage controller 1331a to communicate with a component outside the storage controller 1331a. Each of the interface circuits 1335a and 1336a may include a hardware circuit configured to process communication between the storage controller 1331a and an external component.

For example, the interface circuit 1335a may be connected to the second port of the storage device 1301a. The second port of the storage device 1301a may provide a data path P21a between the storage controller 1331a and the main processor 1101. The storage device 1301a may communicate with the main processor 1101 through the interface circuit 1335a, the data path P21a, and the second port.

For example, the interface circuit 1336a may be connected to the peer-to-peer manager 1350a. A data path P23a may be provided between the interface circuit 1336a and the peer-to-peer manager 1350a. The storage controller 1331a may communicate with the peer-to-peer manager 1350a through the interface circuit 1336a and the data path P23a.

The peer-to-peer manager 1350a may be connected to the first port of the storage device 1301a. The peer-to-peer manager 1350a may be between the first port of the storage device 1301a and the storage controller 1331a. The storage controller 1331a may be between the first port of the storage device 1301a and the second port of the storage device 1301a.

The storage device 1301a may be connected to another device (e.g., the storage device 1301b) outside the storage device 1301a through the first port of the storage device 1301a. The first port of the storage device 1301a may provide a data path P22a between the peer-to-peer manager 1350a and the storage device 1301b. The storage device 1301a may communicate with the storage device 1301b through the data path P22a and the first port of the storage device 1301a.

The peer-to-peer manager 1350a may include an internal switch 1351a and an operation logic circuit 1352a. The internal switch 1351a and the operation logic circuit 1352a may communicate with each other through an internal bus of the peer-to-peer manager 1350a. According to operations of the internal switch 1351a and the operation logic circuit 1352a, the peer-to-peer manager 1350a may provide a path (e.g., the data paths P22a and P23a) for transferring data between the storage controller 1331a and the storage device 1301b in the peer-to-peer manner.

The internal switch 1351a may manage a flow of data to be output from the storage device 1301a through the first port and data received by the storage device 1301a through the first port. Accordingly, the peer-to-peer manager 1350a may output data to the storage device 1301b through the first port or may receive data from the storage device 1301b through the first port, based on data exchanged with the storage controller 1331a.

The internal switch 1351a may be implemented in a hardware circuit to manage a data flow. Herein, the term "switch" is used, but the implementation of the internal switch 1351a may be variously changed or modified. For example, the internal switch 1351a may be implemented in a form of an internal root complex to control a data path, schedule a data transfer, or resolve a communication collision (similarly to the root complex 1003). Alternatively, the internal switch 1351a may be implemented in a form of a combination of an internal root complex and a switch (similarly to the root complex 1003 and the switch 1005).

However, the internal switch 1351a may manage only a data flow between the storage controller 1331a and the first port of the storage device 1301a. Accordingly, the internal switch 1351a may be implemented to have a size (e.g., a circuit size, a circuit area, or a circuit scale) which is smaller than a size of the root complex 1003 and/or the switch 1005.

The operation logic circuit 1352a may perform a processing operation based on data received in the peer-to-peer manager 1350a. For example, the processing operation may include one or more of various operations, such as an operation of monitoring information (e.g., a data amount, a data path, an address, and/or the like) associated with the received data, a redundant array of inexpensive disks (RAID) operation based on the received data, and a regular expression search operation based on the received data. However, the present disclosure is not limited to this example.

For example, the operation logic circuit 1352a may perform a processing operation based on data received from the storage controller 1331a, and may process the received data to generate processed data to be output through the first port of the storage device 1301a. For example, the operation logic circuit 1352a may perform a processing operation based on data received through the first port of the storage device 1301, and may process the received data to generate processed data to be provided to the storage controller 1331a.

To this end, the operation logic circuit 1352a may be implemented in a hardware circuit configured to perform the processing operation. In some example embodiments, the peer-to-peer manager 1350a may be implemented in a form of a field programmable gate array (FPGA) board or application specific integrated circuits (ASICs) which is/are separate from the storage controller 1331a inside a set of the storage device 1301a. For example, the operation logic circuit 1352a may be implemented in a reconfigurable logic circuit based on a configuration of the FPGA board.

Accordingly, the peer-to-peer manager 1350a may process or convert the received data itself to output the processed data or the converted data, rather than simply managing a data flow. The output data may be provided to the storage controller 1331a, or may be provided to the storage device 1301b through the first port of the storage device 1301a. To this end, the peer-to-peer manager 1350a may include two downstream ports connected to the storage controller 1331a and the first port of the storage device 1301a.

The processing operation of the operation logic circuit 1352 may be performed by the main processor 1101. However, in example embodiments, to reduce the workload of the main processor 1101, the storage device 1301a may perform the processing operation by using the operation logic circuit 1352a. An example associated with the processing operation will be described with reference to FIGS. 6 to 9.

The storage device 1301b may include at least one memory device 1310b, a storage controller 1331b, and a peer-to-peer manager 1350b. The storage controller 1331b may include interface circuits 1335b and 1336b. The peer-to-peer manager 1350b may include an internal switch 1351b and an operation logic circuit 1352b.

The peer-to-peer manager 1350b may be connected to the storage device 1301c through the first port of the storage device 1301b and a data path P24a. The interface circuit 1335b may be connected to the storage device 1301a through the second port of the storage device 1301b and the data path P22a. The interface circuit 1336b may be connected to the peer-to-peer manager 1350b through a data path P25a.

Operations and configurations of the storage device 1301b, the memory device 1310b, the storage controller 1331b, the interface circuits 1335b and 1336b, the peer-to-peer manager 1350b, the internal switch 1351b, and the operation logic circuit 1352b may be substantially identical or similar to those of the storage device 1301a, the memory device 1310a, the storage controller 1331a, the interface circuits 1335a and 1336a, the peer-to-peer manager 1350a, the internal switch 1351a, and the operation logic circuit 1352a. For brevity, redundant description will be omitted below.

The storage device 1301c may include at least one memory device 1310c, a storage controller 1331c, and a peer-to-peer manager 1350c. The storage controller 1331c may include interface circuits 1335c and 1336c. The peer-to-peer manager 1350c may include an internal switch 1351c and an operation logic circuit 1352c.

The peer-to-peer manager 1350c may be connected to the main processor 1101 through the first port of the storage device 1301c and a data path P27a. The interface circuit 1335c may be connected to the storage device 1301b through the second port of the storage device 1301c and the data path P24a. The interface circuit 1336c may be connected to the peer-to-peer manager 1350c through a data path P26a.

Operations and configurations of the storage device 1301c, the memory device 1310c, the storage controller 1331c, the interface circuits 1335c and 1336c, the peer-to-peer manager 1350c, the internal switch 1351c, and the operation logic circuit 1352c may be substantially identical or similar to those of the storage device 1301a, the memory device 1310a, the storage controller 1331a, the interface circuits 1335a and 1336a, the peer-to-peer manager 1350a, the internal switch 1351a, and the operation logic circuit 1352a. For brevity, redundant description will be omitted below.

In each of the storage devices 1301a, 1301b, and 1301c, at least one port of the first port and the second port may be connected another storage device. Meanwhile, the other port, which is not connected to the other storage device, from among the first port and the second port may be connected to the host (e.g., the main processor 1101).

For example, in the storage device 1301b, when both the first port and the second port are connected to other storage devices, the storage device 1301b may not be connected to the host. In this case, the storage device 1301b may not communicate directly with the main processor 1101. Instead, the storage device 1301b may communicate with the main processor 1101 through the storage device 1301a or 1301c.

Some ports of the storage devices 1301a, 1301b, and 1301c may not be connected to the main processor 1101. However, when the data paths P21a and P27a directed to the main processor 1101 are provided, reliability may be improved. For example, even if the data path P27a has a failure or is disabled, the data path P21a may provide communication with the main processor 1101.

FIGS. 6 to 9 are block diagrams for describing example operations associated with the storage devices 1301a, 1301b, and 1301c of FIG. 5.

Example operations of FIGS. 6 to 9 may be associated with a case where the host (e.g., the main processor 1101) requests the RAID operation (e.g., a parity operation) with regard to data D1, D2, and D3 stored in the storage devices 1301a, 1301b, and 1301c. The operation logic circuits 1352a, 1352b, and 1352c may perform the RAID operation as the processing operation.

Figure 6:
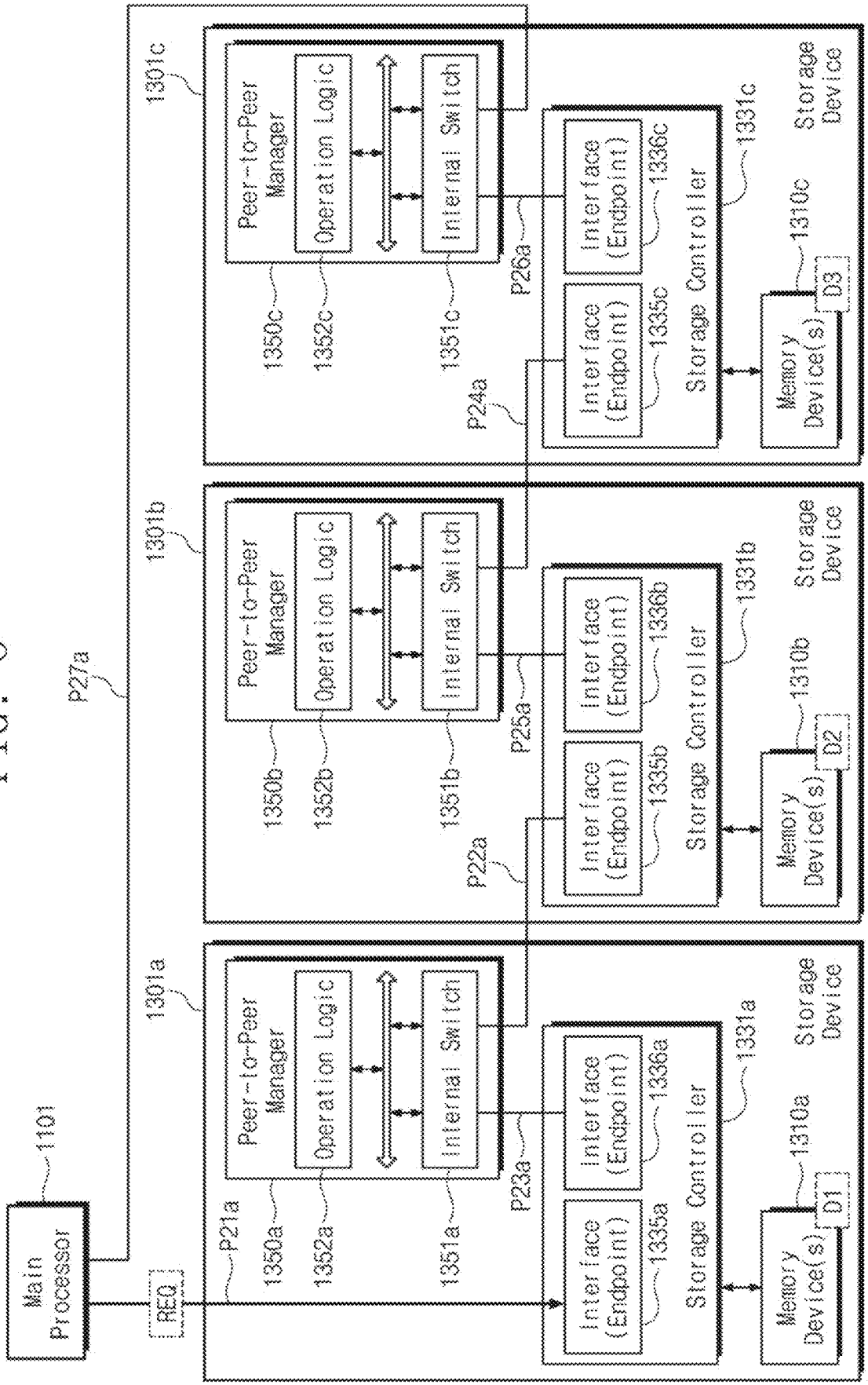
FIGS. 6 to 10 are block diagrams for describing example operations associated with storage devices of FIG. 5.

Referring to FIG. 6, the storage controller 1331a may receive a request REQ from the main processor 1101 through the second port of the storage device 1301a and the interface circuit 1335a. The request REQ may be directed to the storage device 1301a and another storage device (e.g., the storage devices 1301b and 1301c). For example, the request REQ may request calculation of parity which corresponds to the data D1, D2, and D3.

Figure 7:
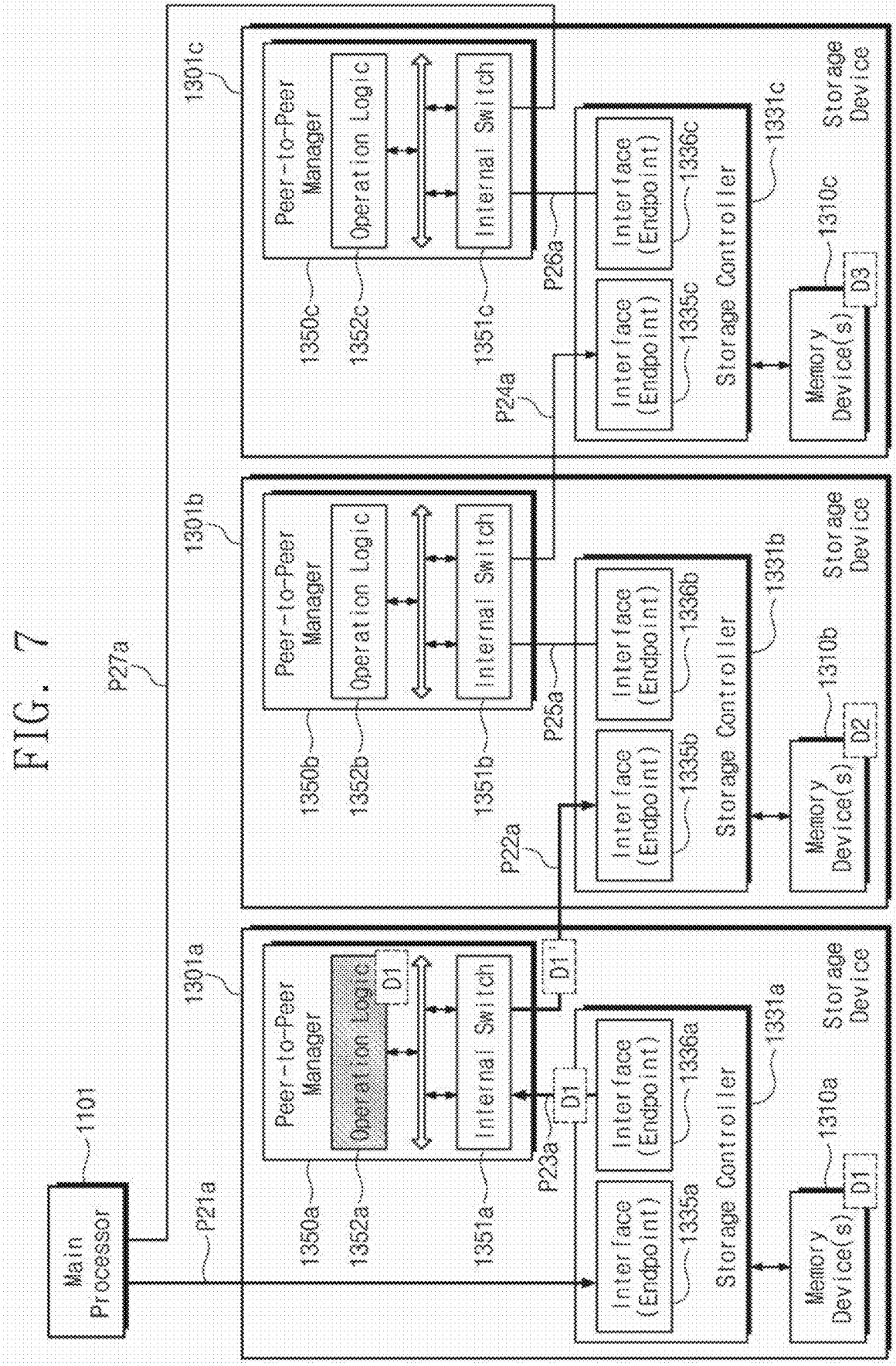

Referring to FIG. 7, the storage controller 1331a may perform the operation requested with respect to the storage device 1301a, in response to the request REQ. For example, the storage controller 1331a may control the memory device 1310a such that the memory device 1310a outputs the data D1.

In addition, the storage controller 1331a may exchange data, which is associated with the operation requested with respect to another storage device, with the peer-to-peer manager 1350a through the interface circuit 1336a, in response to the request REQ. For example, the storage controller 1331a may provide the data D1 to the peer-to-peer manager 1350a.

The operation logic circuit 1352a may perform the processing operation based on at least one data of data stored in the memory device 1310a and/or data received through the second port of the storage device 1301a. For example, the operation logic circuit 1352a may perform the processing operation (e.g., a parity operation) based on the data D1.

The operation logic circuit 1352a may process the data D1 to generate processed data D1'. The data D1' may be used in an operation to be performed in the storage device 1301b. The parity operation has been performed only on one data D1, and the data D1' may be identical to the data D1.

The internal switch 1351a may manage a flow of the data D1 and D1'. The internal switch 1351a may receive the data D1 from the storage controller 1331a, and may output the data D1' to the first port of the storage device 1301a. Accordingly, the peer-to-peer manager 1350a may output the data D1' to the storage device 1301b without intervention of the host.

The storage device 1301a may communicate with the storage device 1301b through the first port of the storage device 1301a and the second port of the storage device 1301b without intervention of the host. The storage controller 1331b may receive the data D1' from the storage device 1301a through the second port of the storage device 1301b and the interface circuit 1335b.

Figure 8:
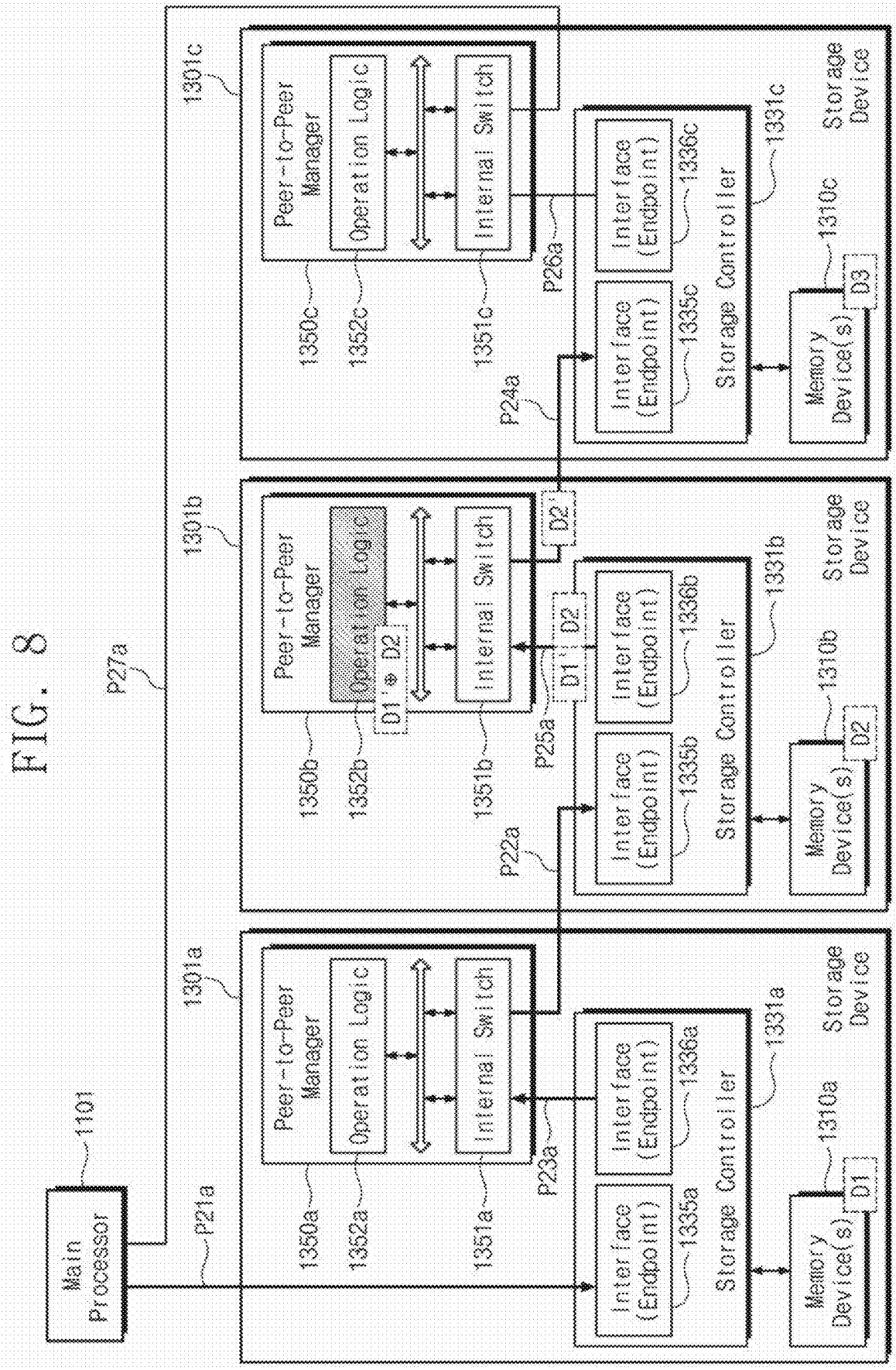

Referring to FIG. 8, the storage controller 1331b may perform the operation requested with respect to the storage device 1301b. For example, the storage controller 1331b may control the memory device 1310b such that the memory device 1310b outputs the data D2. To this end, for example, the storage controller 1331b may receive information associated with the data D2 and the request REQ from the storage device 1301a, together with receiving the data D1'. The storage controller 1331b may provide the data D1' and D2 to the peer-to-peer manager 1350b through the interface circuit 1336b.

The operation logic circuit 1352b may perform the processing operation based on at least one data of data stored in the memory device 1310b and/or data received through the second port of the storage device 1301b. For example, the operation logic circuit 1352b may perform the parity operation based on the data D1' and D2. The operation logic circuit 1352b may process the data D1' and D2 to generate processed data D2'.

The parity operation performed by the operation logic circuit 1352a may include a first portion (e.g., a partial operation on the data D1) of the operation requested by the main processor 1101. As the storage device 1301a outputs the data D1' to the storage device 1301b, the operation logic circuit 1352b may perform a second portion (e.g., a partial operation on the data D1' and D2) of the operation requested by the main processor 1101. Herein, the operation of the second portion may not overlap the operation of the first portion.

As the operation logic circuit 1352b performs the parity operation, the data D2' may be generated to be different from each of the data D1' and the data D2. The data D2' may be used in an operation to be performed in the storage device 1301c.

The internal switch 1351b may manage a flow of the data D1', D2, and D2'. The internal switch 1351b may receive the data D1' and D2 from the storage controller 1331b, and may output the data D2' to the first port of the storage device 1301b. The peer-to-peer manager 1350b may output the data D2' to the storage device 1301c without intervention of the host.

The storage device 1301b may communicate with the storage device 1301c through the first port of the storage device 1301b and the second port of the storage device 1301c without intervention of the host. The storage controller 1331c may receive the data D2' from the storage device 1301b through the second port of the storage device 1301c and the interface circuit 1335c.

Figure 9:
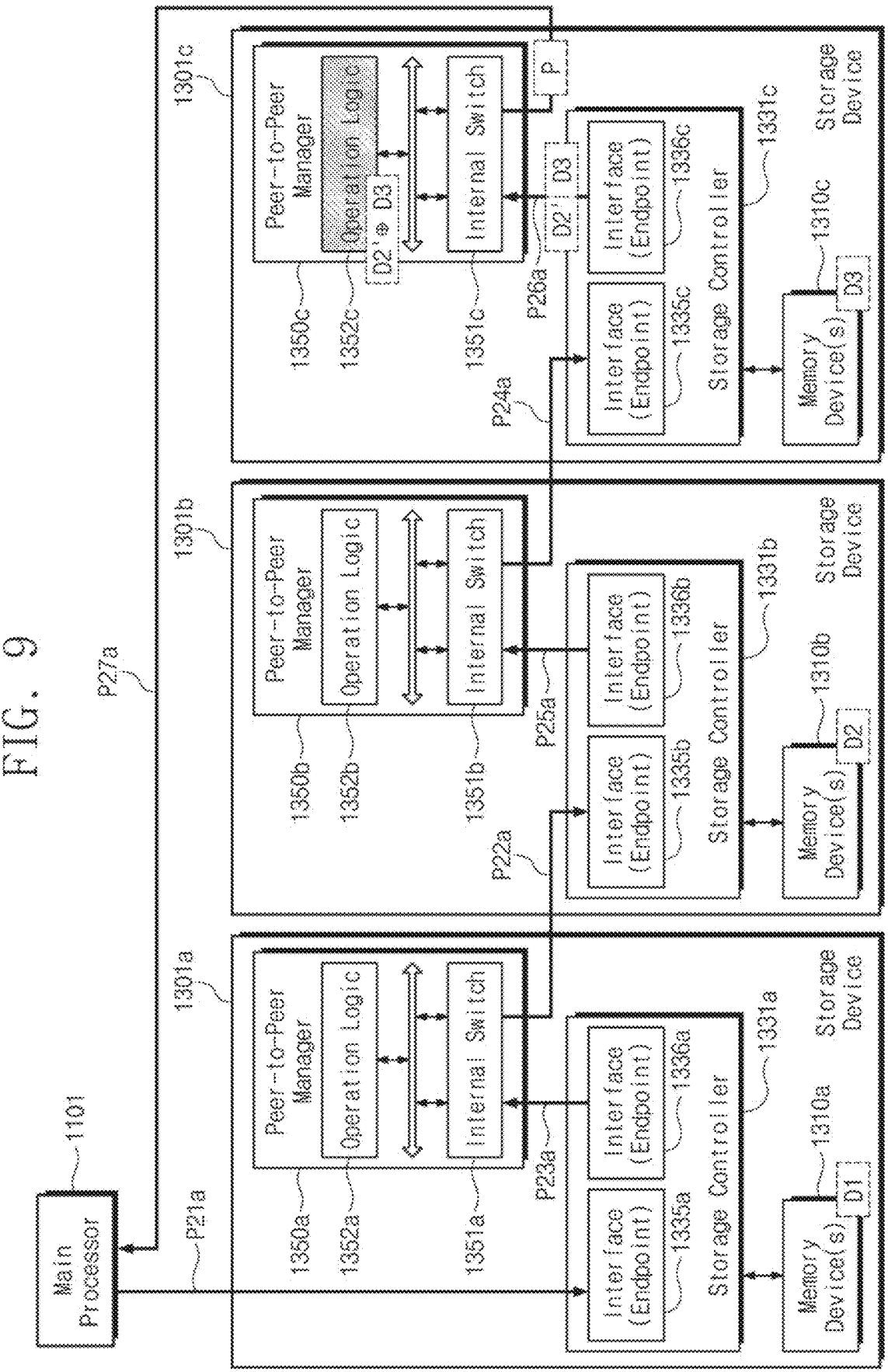

Referring to FIG. 9, the storage controller 1331c may control the memory device 1310c such that the memory device 1310c outputs the data D3. The storage controller 1331c may provide the data D2' and D3 to the peer-to-peer manager 1350c through the interface circuit 1336c.

The operation logic circuit 1352c may perform the parity operation based on the data D2' and D3. The operation logic circuit 1352c may generate a parity P as processed data. The parity P may be an operation result which corresponds to the request REQ of the main processor 1101.

The internal switch 1351c may receive the data D2' and D3 from the storage controller 1331b, and may output the parity P to the first port of the storage device 1301c. The storage device 1301c may output the parity P through the first port of the storage device 1301c. Accordingly, the parity P may be provided to the main processor 1101.

The operation requested by the main processor 1101 to obtain the parity P may be distributively performed on the storage devices 1301a, 1301b, and 1301c. The main processor 1101 may not intervene in the parity operation, and thus workload of the main processor 1101 may be reduced. Each of the operation logic circuits 1352a, 1352b, and 1352c may perform a part of the operation. As the partial operations are successively performed, the operation may be completed and the parity P may be obtained.

Figure 10:
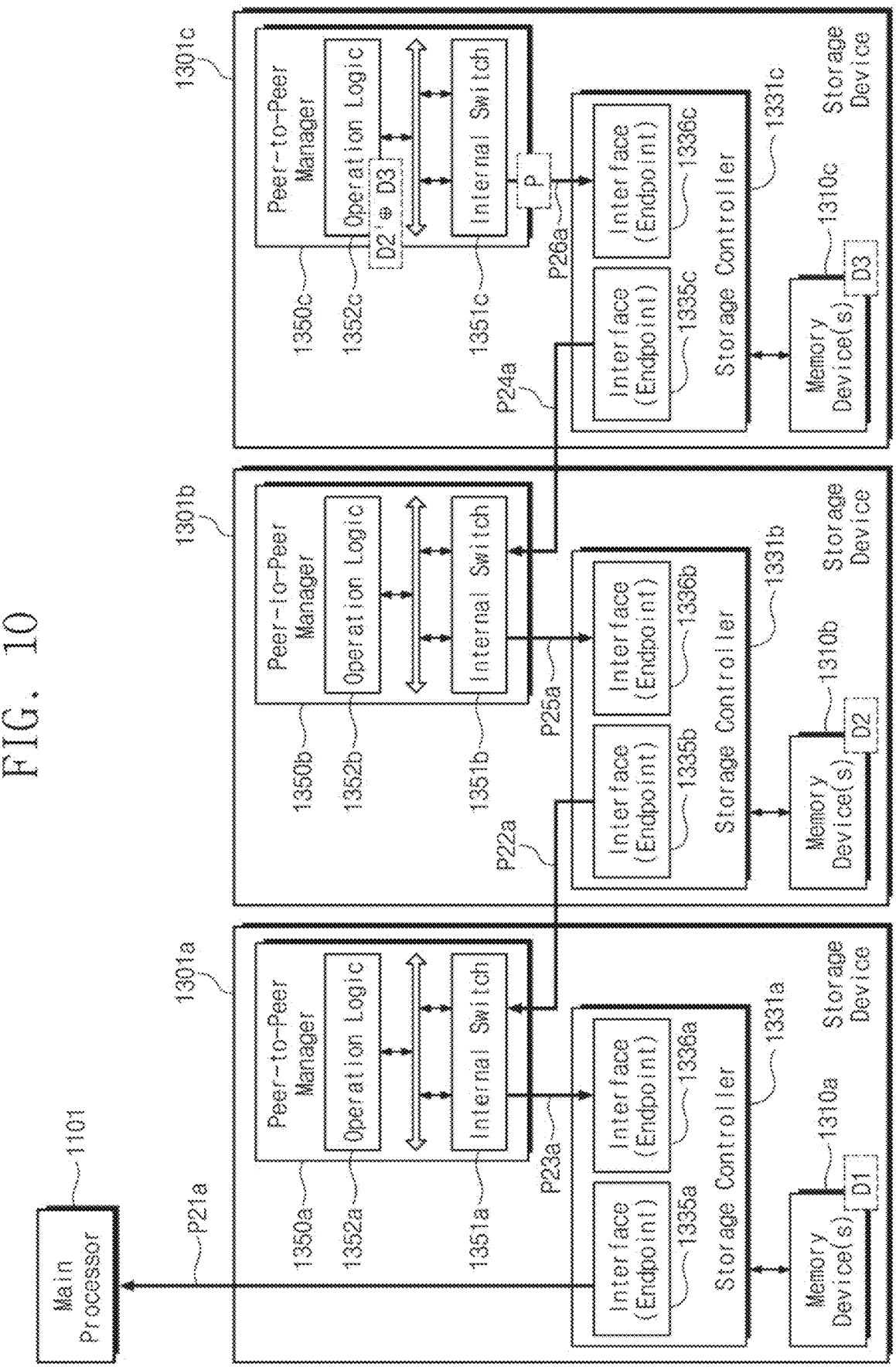

FIG. 10 is a block diagram for describing example operations associated with the storage devices 1301a, 1301b, and 1301c of FIG. 5.

In some cases, the data path P27a of FIG. 5 may not be connected. For example, the data path P27a may have failed or may be disabled. For example, to simplify a circuit configuration, the data path P27a may not be provided.

In these cases, the storage device 1301c may provide the parity P to the storage device 1301b through the second port of the storage device 1301c and the first port of the storage device 1301b. In this manner, the parity P may be provided to the main processor 1101 through the storage devices 1301b and 1301a. The storage device 1301a may output the parity P to the main processor 1101 through the second port of the storage device 1301a.

A direction of a path for transmitting the parity P to the main processor 1101 in the example of FIG. 10 may be opposite to a direction of a path for transmitting the data in the example of FIGS. 6 to 9. The interface circuits 1335a, 1336a, 1335b, 1336b, 1335c, and 1336c and the peer-to-peer managers 1350a, 1350b, and 1350c may support bidirectional communication.

Example operations have been described with reference to FIGS. 6 to 10. However, the descriptions are provided to facilitate better understanding, and are not intended to limit the present disclosure. Operations of the storage devices 1301a, 1301b, and 1301c may be variously changed or modified to provide peer-to-peer communication between the storage devices 1301a, 1301b, and 1301c to perform a processing operation such as the parity operation. In addition, it may be readily understood that example embodiments may also be applied with regard to various processing operations as well as the parity operation.

Figure 11:
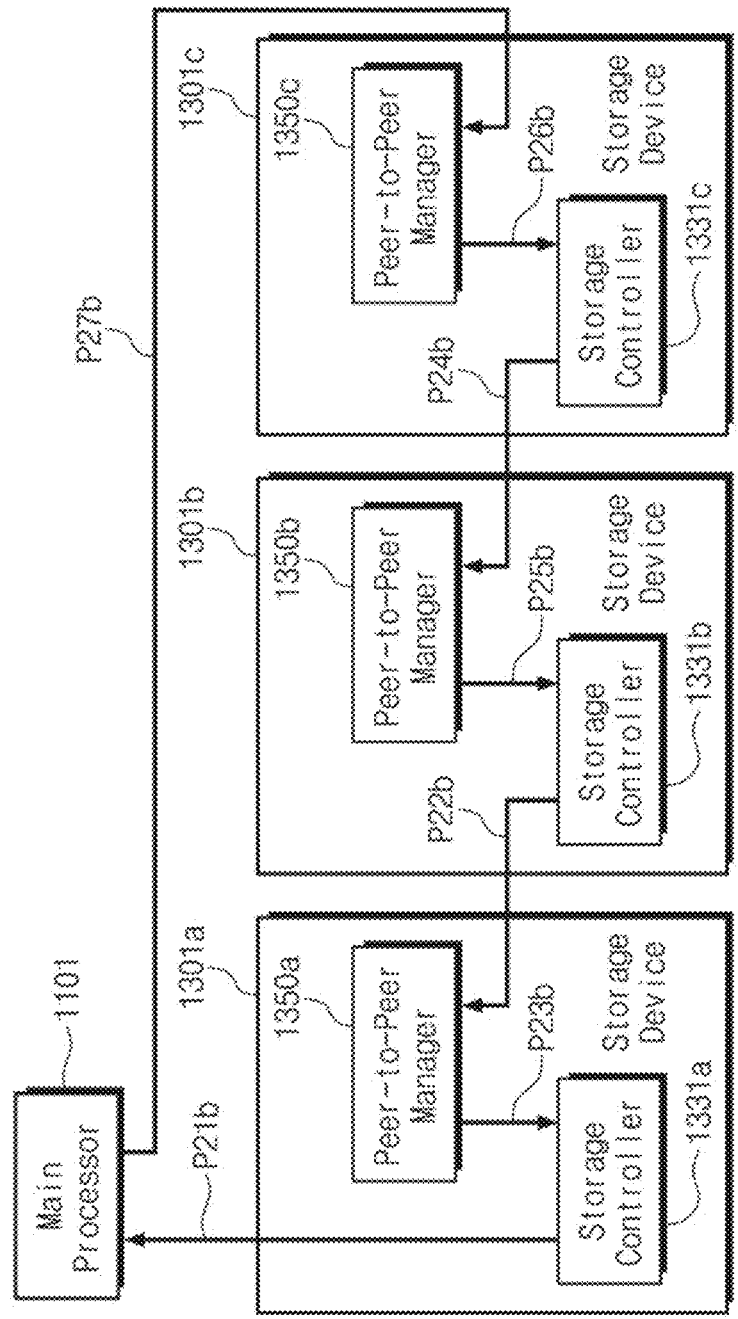
FIGS. 11 and 12 are block diagrams illustrating example configurations associated with storage devices of FIG. 5.
Figure 12:
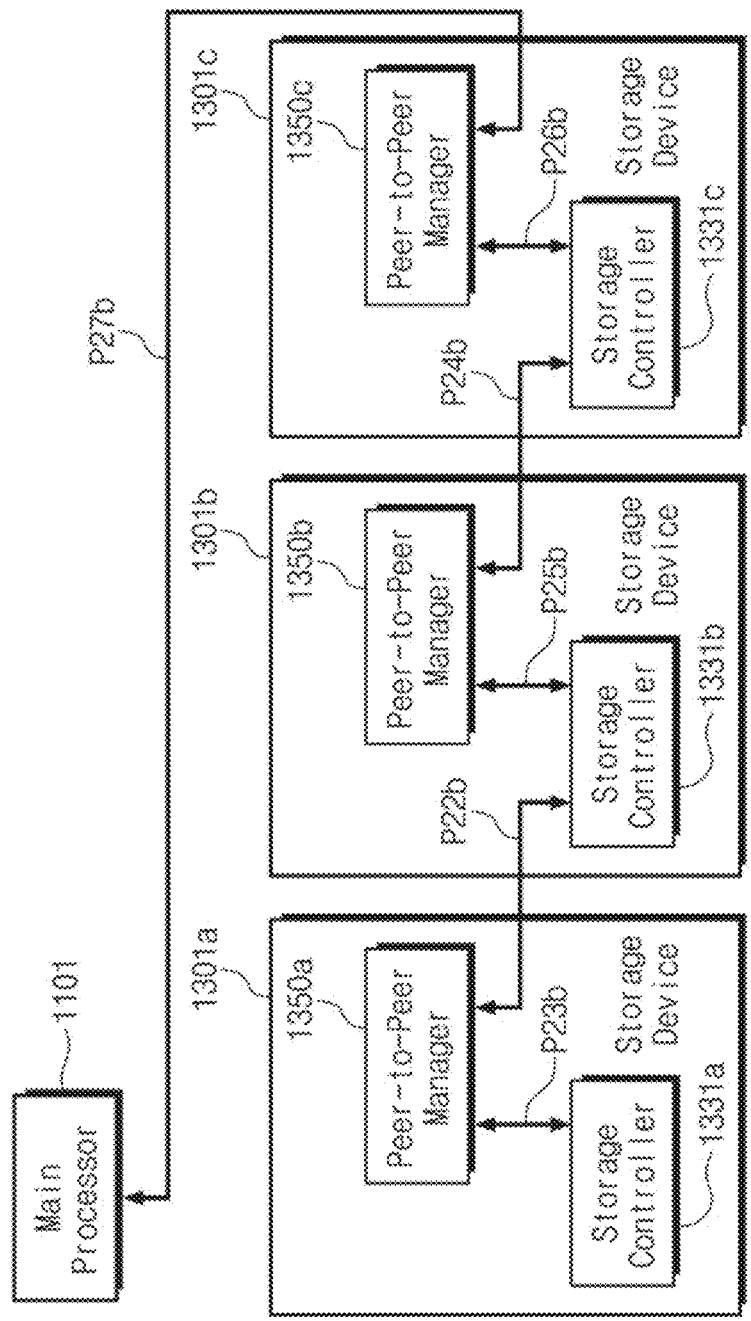

FIGS. 11 and 12 are block diagrams illustrating example configurations associated with the storage devices 1301a, 1301b, and 1301c of FIG. 5.

Referring to FIG. 11, the main processor 1101 may communicate with the storage devices 1301a, 1301b, and 1301c through data paths P21b and P27b. The storage devices 1301a, 1301b, and 1301c may communicate with each other in a peer-to-peer manner through data paths P22b to P26b. The data paths P21b to P27b may correspond to the data paths P21a to P27a.

Unlike the example operations of FIGS. 6 to 10, in the example of FIG. 11, the storage device 1301c may receive a request from the main processor 1101. The peer-to-peer manager 1350c may perform a processing operation in response to the request of the main processor 1101, and thus may provide processed data to the storage controller 1331c.

In this manner, the peer-to-peer managers 1350c, 1350b, and 1350a may distributively perform an operation requested by the main processor 1101, and thus an operation result may be generated. The operation result may be output to the main processor 1101 through the storage controller 1331a of the storage device 1301a.

In some example embodiments, an operation logic circuit may not be provided between the main processor 1101 and the storage controller 1331a. In some cases, additional processing may be required for data output from the storage controller 1331a to the main processor 1101. For example, an additional parity operation may be required for processed data provided from the peer-to-peer manager 1350a and data stored in the memory device 1310a of the storage device 1301a, and the storage controller 1331a may provide the processed data and the stored data to the main processor 1101.

In this example, the main processor 1101 may perform the additional parity operation. The main processor 1101 partially intervenes in the processing operation, but the peer-to-peer managers 1350c, 1350b, and 1350a may perform most portions of the operation. In addition, the main processor 1101 may not intervene in communication between the storage devices 1301a, 1301b, and 1301c. Accordingly, the intervention of the main processor 1101 may be minimized.

Referring to FIG. 12, in some cases, the data path P21b of FIG. 11 may not be connected. For example, the data path P21b may have failed or may be disabled. For example, to simplify a circuit configuration, the data path P21b may not be provided. In this case, the operation result of the peer-to-peer manager 1350a may be provided to the main processor 1101 through the storage devices 1301b and 1301c. A direction of a path for transmitting the operation result to the main processor 1101 in the example of FIG. 12 may be opposite to a direction of a path for transmitting the data in the example of FIG. 11.

With regard to the example embodiments described with reference to FIGS. 5 to 12, each of the interface circuits 1335a, 1336a, 1335b, 1336b, 1335c, and 1336c may be connected to the main processor 1101 or downstream ports of the peer-to-peer managers 1350a, 1350b, and 1350c. Accordingly, the interface circuits 1335a, 1336a, 1335b, 1336b, 1335c, and 1336c may operate such that the respective storage devices 1301a, 1301b, and 1301c operate as endpoint devices.

Figure 13:
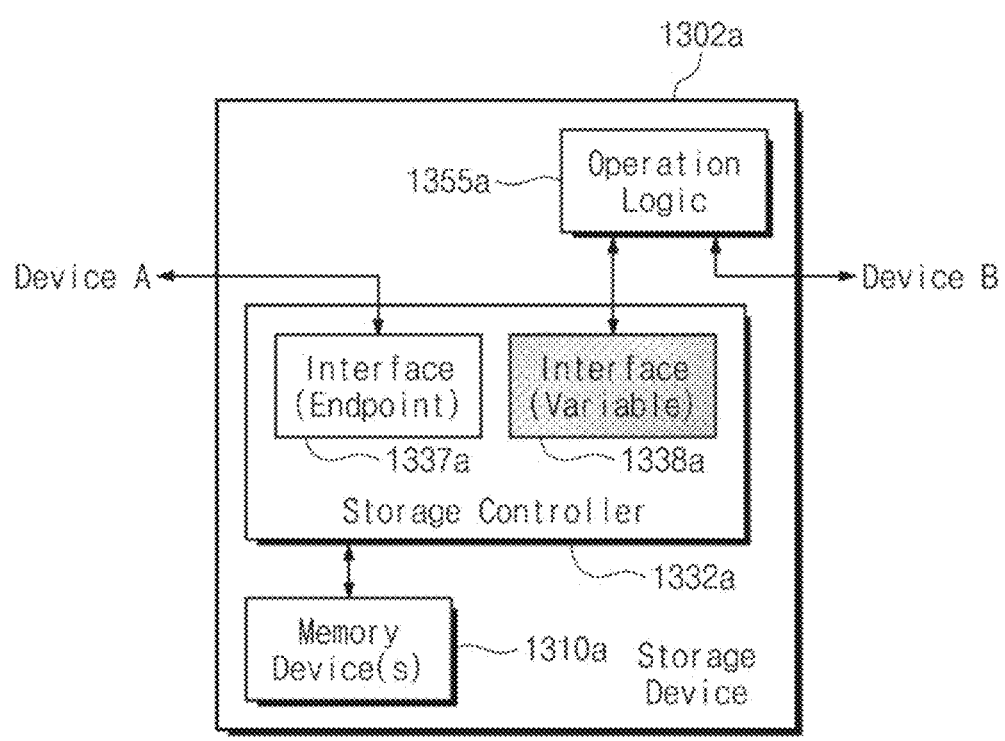
FIGS. 13 and 14 are block diagrams illustrating example configurations associated with storage devices of FIG. 1.
Figure 14:
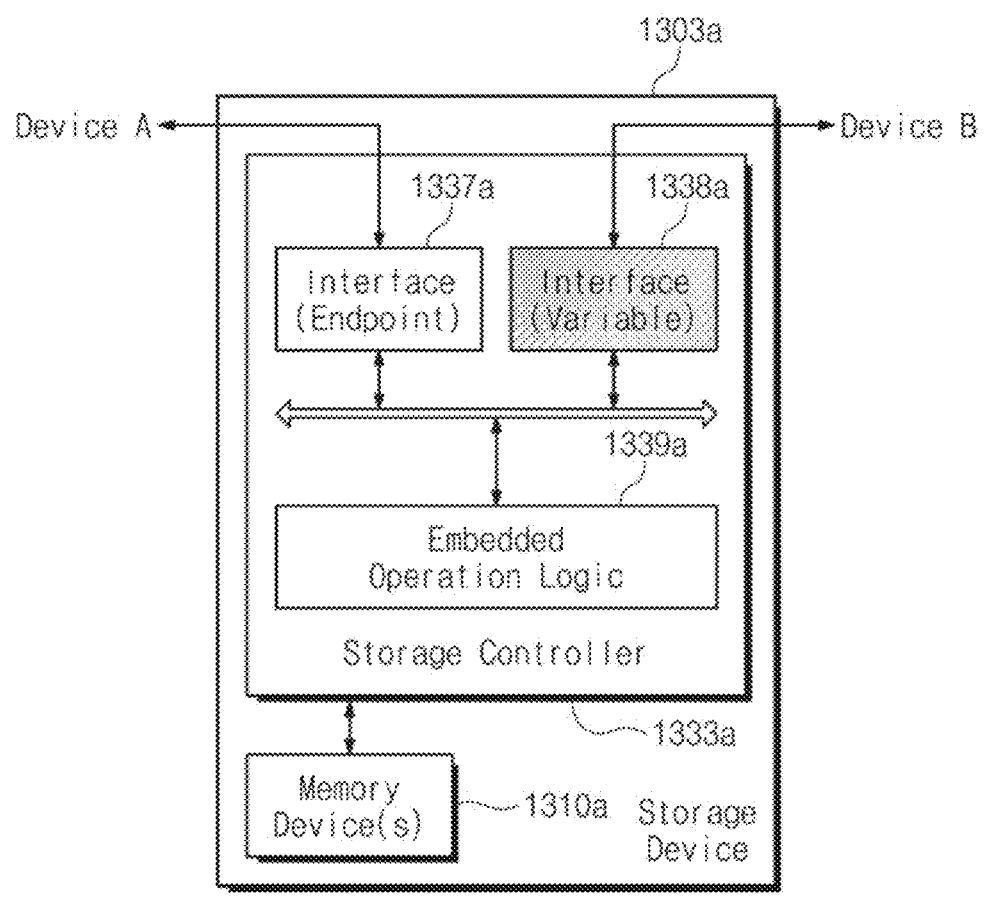

FIGS. 13 and 14 are block diagrams illustrating example configurations associated with the storage device 1300a of FIG. 1.

Referring to FIG. 13, in some example embodiments, the storage device 1300a may include a storage device 1302a. The storage device 1302a may include at least one memory device 1310a, a storage controller 1332a, and an operation logic circuit 1355a. The storage controller 1332a may include an interface circuit 1337a and a variable interface circuit 1338a.

The storage controller 1332a, the interface circuit 1337a, and the operation logic circuit 1355a may correspond to the storage controller 1331a, the interface circuit 1335a, and the operation logic circuit 1352a respectively. The storage controller 1332a may control and manage overall operations of the storage device 1302a. The interface circuit 1337a may support communication with a device A (e.g., a host or other storage device) outside the storage device 1302a through a second port of the storage device 1302a.

The operation logic circuit 1355a may perform a processing operation to generate processed data. The operation logic circuit 1355a may exchange data with a device B (e.g., a host or other storage device) outside the storage device 1302a through a first port of the storage device 1302a. The operation logic circuit 1355a may be connected to the variable interface circuit 1338a.

The internal switch 1351a and the operation logic circuit 1352a described with reference to FIGS. 5 to 12 may be implemented on a single component (e.g., a single FPGA board, a single chip, or the like). However, in some example embodiments, the internal switch 1351a and the operation logic circuit 1352a may be implemented in separate components (e.g., separate chips, separate circuits, or the like). When the internal switch 1351a is separated from the operation logic circuit 1352a, in some example embodiments, the internal switch 1351a may be implemented within the storage controller 1331a.

For example, the variable interface circuit 1338a of the storage controller 1332a may include configurations of the internal switch 1351a and may perform operations of the internal switch 1351a. The variable interface circuit 1338a may operate in an operation mode which is selected from among a plurality of operation modes. The operation mode may be selected based on whether the first port of the storage device 1302a is connected to the device B and a type of the connected device B.

For example, the operation mode of the variable interface circuit 1338a may include an endpoint operation mode associated with an operation of an endpoint device (e.g., for supporting the storage device 1302a such that the storage device 1302a operates as an endpoint device). For example, the operation mode of the variable interface circuit 1338a may include a switch operation mode associated with communication with the device B (e.g., for supporting the communication with the device B).

To this end, the variable interface circuit 1338*a* may include a hardware circuit of a physical layer and/or a logical layer configured to transmit/receive and process data, a signal, and/or a packet. In addition, the variable interface circuit 1338*a* may include a hardware circuit of a root complex and/or a switch to manage data exchange with the device B. The variable interface circuit 1338*a* may operate differently based on the selected operation mode.

Referring to FIG. 14, in some example embodiments, the storage device 1300*a* may include a storage device 1303*a*. The storage device 1303*a* may include at least one memory device 1310*a* and a storage controller 1333*a*. The storage controller 1333*a* may include the interface circuit 1337*a*, the variable interface circuit 1338*a*, and an embedded operation logic circuit 1339*a*. The storage controller 1333*a* may correspond to the storage controller 1331*a*, and may control and manage overall operations of the storage device 1303*a*.

The interface circuit 1337*a* may be connected to a second port of the storage device 1303*a*, and may support communication with a device A through the second port of the storage device 1303*a*. The variable interface circuit 1338*a* may be connected to a first port of the storage device 1303*a*, and may support communication with a device B through the first port of the storage device 1303*a*. The variable interface circuit 1338*a* may operate in an operation mode which is selected based on whether the first port of the storage device 1303*a* is connected to the device B and a type of the connected device B.

In some example embodiments, the operation logic circuit 1352*a* or 1355*a* may also be implemented within the storage controller 1331*a*. For example, the embedded operation logic circuit 1339*a* of the storage controller 1333*a* may include configurations of the operation logic circuit 1352*a* or 1355*a* and may perform operations of the operation logic circuit 1352*a* or 1355*a*.

The interface circuit 1337*a*, the variable interface circuit 1338*a*, and the embedded operation logic circuit 1339*a* may communicate with each other through an internal bus of the storage controller 1333*a*. For example, the embedded operation logic circuit 1339*a* may be implemented in a form of an embedded FPGA or embedded ASICs. For example, the embedded operation logic circuit 1339*a* may be implemented in a reconfigurable logic circuit.

The embedded operation logic circuit 1339*a* may perform a processing operation. The embedded operation logic circuit 1339*a* may process data received through the first port of the storage device 1303*a* to generate processed data to be output through the second port of the storage device 1303*a*. The embedded operation logic circuit 1339*a* may process data received through the second port of the storage device 1303*a* to generate processed data to be output through the first port of the storage device 1303*a*.

Figure 15:
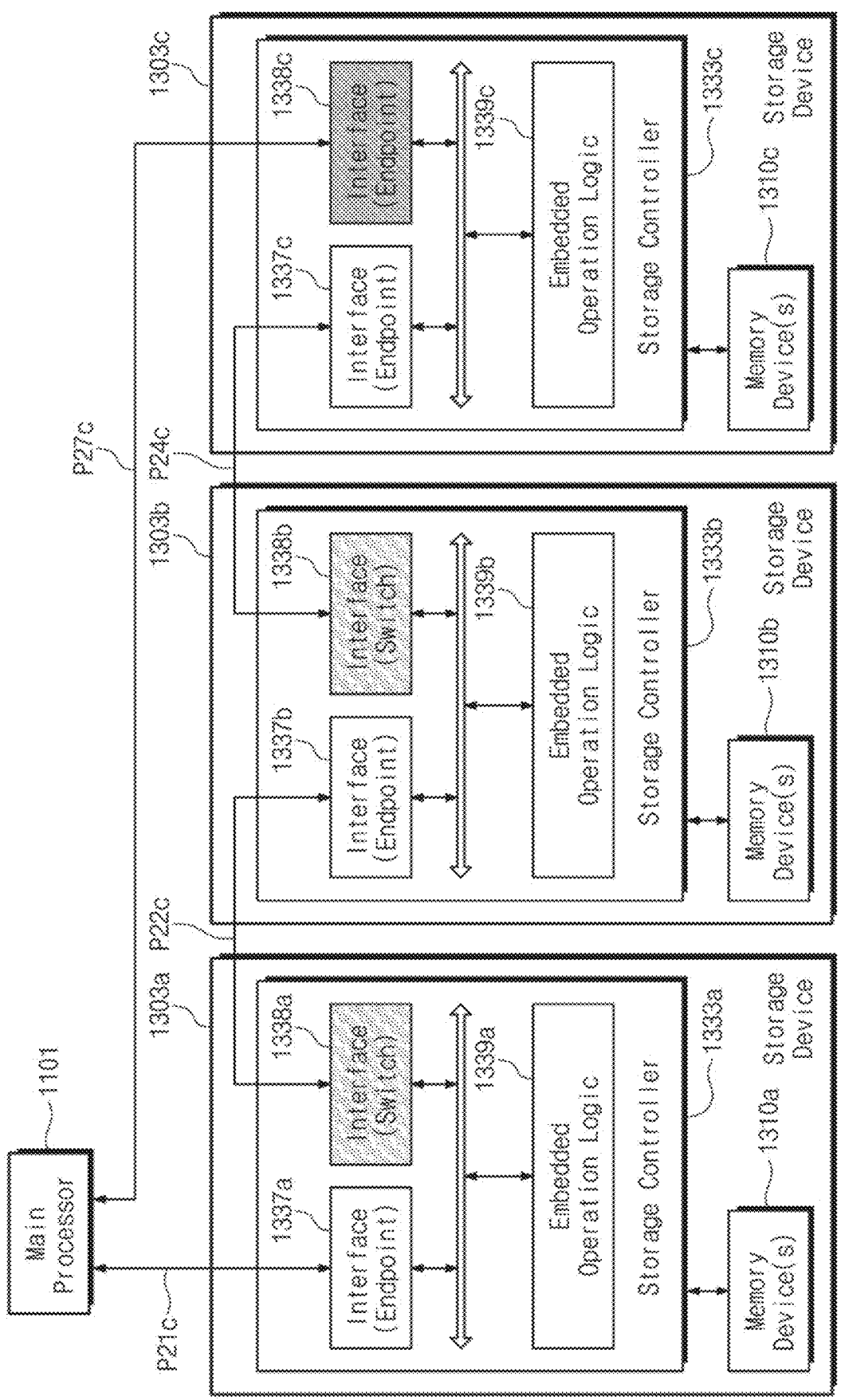
FIG. 15 is a block diagram illustrating an example configuration associated with storage devices of FIG. 1.

FIG. 15 is a block diagram illustrating an example configuration associated with the storage devices 1300*a*, 1300*b*, and 1300*c* of FIG. 1.

In some example embodiments, the storage devices 1300*a*, 1300*b*, and 1300*c* may include storage devices 1303*a*, 1303*b*, and 1303*c* respectively. Each of the storage devices 1303*a*, 1303*b*, and 1303*c* may be implemented in a dual-port structure, and the storage devices 1303*a*, 1303*b*, and 1303*c* may communicate with each other in a peer-to-peer manner without intervention of the host (e.g., the main processor 1101).

The storage device 1303*b* may include at least one memory device 1310*b* and a storage controller 1333*b*. The storage controller 1333*b* may include an interface circuit 1337*b*, a variable interface circuit 1338*b*, and an embedded operation logic circuit 1339*b*. Configurations and operations of the storage controller 1333*b*, the interface circuit 1337*b*, the variable interface circuit 1338*b*, and the embedded operation logic circuit 1339*b* may be substantially identical or similar to those of the storage controller 1333*a*, the interface circuit 1337*a*, the variable interface circuit 1338*a*, and the embedded operation logic circuit 1339*a*.

The storage device 1303*c* may include at least one memory device 1310*c* and a storage controller 1333*c*. The storage controller 1333*c* may include an interface circuit 1337*c*, a variable interface circuit 1338*c*, and an embedded operation logic circuit 1339*c*. Configurations and operations of the storage controller 1333*c*, the interface circuit 1337*c*, the variable interface circuit 1338*c*, and the embedded operation logic circuit 1339*c* may be substantially identical or similar to those of the storage controller 1333*a*, the interface circuit 1337*a*, the variable interface circuit 1338*a*, and the embedded operation logic circuit 1339*a*. For brevity, redundant description will be omitted below.

The interface circuit 1337*a* may be connected to the second port of the storage device 1303*a*. The second port of the storage device 1303*a* may provide a data path P21*c* between the storage controller 1333*a* and the main processor 1101. Accordingly, the storage device 1303*a* may communicate with the main processor 1101 and may exchange data with the main processor 1101 through the data path P21*c*.

The embedded operation logic circuit 1339*a* may perform a processing operation based on at least one data of data stored in the memory device 1310*a* and/or data received through the second port (or the first port) of the storage device 1303*a*. The embedded operation logic circuit 1339*a* may perform the processing operation to generate processed data. The processed data may be output to another device (e.g., the main processor 1101, the storage device 1303*b*, and/or the like) through the first port (or the second port) of the storage device 1303*a*.

The variable interface circuit 1338*a* may be connected to the first port of the storage device 1303*a*. The interface circuit 1337*b* may be connected to the second port of the storage device 1303*b*. The first port of the storage device 1303*a* and the second port of the storage device 1303*b* may provide a data path P22*c* between the storage controller 1333*a* and the storage controller 1333*b*. Accordingly, the storage device 1303*a* may communicate with the storage device 1303*b* and may exchange data with the storage device 1303*b* in a peer-to-peer manner without intervention of the main processor 1101.

The embedded operation logic circuit 1339*b* may perform a processing operation based on at least one data of data stored in the memory device 1310*b* and/or data received through the second port (or the first port) of the storage device 1303*b*. The embedded operation logic circuit 1339*b* may perform the processing operation to generate processed data. The processed data may be output to another device (e.g., the storage device 1303*a* or 1303*c*) through the first port (or the second port) of the storage device 1303*b*.

Likewise, the first port of the storage device 1303*b* and the second port of the storage device 1303*c* may provide a data path P24*c* between the storage controller 1333*b* and the storage controller 1333*c*. The storage device 1303*b* may communicate with the storage device 1303*c* and may exchange data with the storage device 1303*c* through the variable interface circuit 1338*b*, the data path P24*c*, and the interface circuit 1337*c* in a peer-to-peer manner without intervention of the main processor 1101.

The first port of the storage device 1303c may provide a data path P27c between the storage controller 1333c and the main processor 1101. The storage device 1303c may communicate with the main processor 1101 and may exchange data with the main processor 1101 through the variable interface circuit 1338c and the data path P27c. The embedded operation logic circuit 1339c may generate processed data based on at least one data of data received through the first port and/or the second port of the storage device 1303c and data stored in the memory device 1310c.

For example, the storage controller 1333a may receive a request directed to the storage devices 1303a, 1303b, and 1303c through the interface circuit 1337a. The storage controller 1333a may perform the operation requested with respect to the storage device 1303a. The storage controller 1333a may output or receive data, which is associated with the operation requested with respect to the storage devices 1303b and 1303c, through the variable interface circuit 1338a.

The embedded operation logic circuits 1339a, 1339b, and 1339c may distributively perform the operation requested by the main processor 1101. Accordingly, the storage controller 1333c may output data of an operation result corresponding to the request of the main processor 1101, to the main processor 1101 through the variable interface circuit 1338c. In some cases, the storage controller 1333c may receive data or a request from the main processor 1101 through the variable interface circuit 1338c.

Operations and configurations of the storage devices 1303a, 1303b, and 1303c may be similar to those described with reference to FIGS. 5 to 12. In some cases, the data path P21c or P27c may not be provided, and the storage controllers 1333a, 1333b, and 1333c may support bidirectional communication. FIG. 15 illustrates a configuration associated with the storage device 1303a of FIG. 14, but it may be readily understood that the storage device 1302a of FIG. 13 may also be employed in a similar manner to those described with reference to FIGS. 5 to 12 and 15.

Each of the interface circuits 1337a, 1337b, and 1337c may be connected to the main processor 1101 or a downstream port. The interface circuits 1337a, 1337b, and 1337c may operate in the endpoint operation mode. The variable interface circuit 1338c may be connected to the main processor 1101, and thus may operate in the endpoint operation mode. As the variable interface circuit 1338c operates in the endpoint operation mode, the first port of the storage device 1303c may be understood as a downstream port.

The variable interface circuits 1338a and 1338b may be respectively connected to the storage devices 1303b and 1303c. Each of the variable interface circuits 1338a and 1338b may operate in the switch operation mode to support communication with an external storage device. In the switch operation mode, the variable interface circuits 1338a and 1338b may provide a function of a root complex and/or a switch to manage data exchange. As the variable interface circuits 1338a and 1338b operate in the switch operation mode, the first port of each of the storage devices 1303a and 1303b may be understood as an upstream port.

FIG. 15 illustrates that each of the storage devices 1303a, 1303b, and 1303c includes one variable interface circuit. In some example embodiments, each of the storage devices 1303a, 1303b, and 1303c may include two variable interface circuits. For example, the interface circuit 1337a of the storage device 1303a may also be implemented in a variable interface circuit. In this case, the interface circuit 1337a may support communication with an external storage device as well as communication with the main processor 1101, and thus flexibility for connection of the storage device 1303a may be improved.

Figure 16:
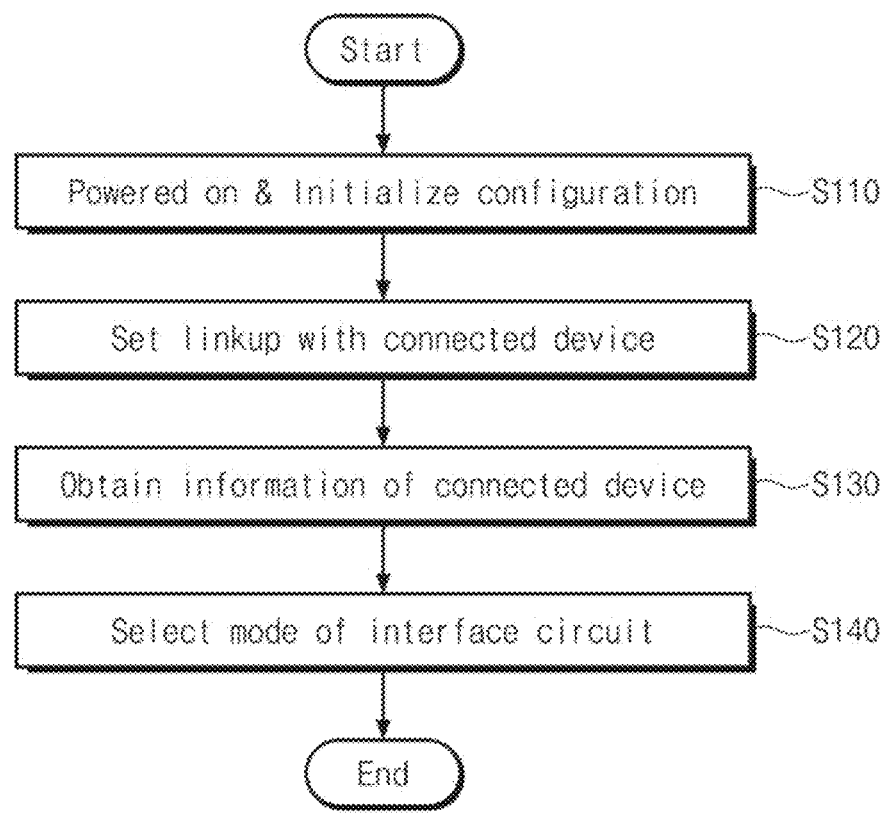
FIGS. 16 and 17 are flowcharts describing example operations of a variable interface circuit of FIG. 15.

FIG. 16 is a flowchart describing an example operation of the variable interface circuit of FIG. 15.

As power is supplied to a storage device and the storage device is turned on, the storage device may initialize a configuration (S110). For example, the storage device may recognize and configure states of components, a state of connection to an external device, a setting value, and/or the like, during a booting operation.

Afterwards, the storage device may set a linkup state with the connected external device (S120). The linkup state may be provided to recognize the opponent device and establish a circumstance for communication with the opponent device. To set the linkup state, the storage device may provide the external device with information (e.g., a device type, a communication capability, a configuration of a transmitter/receiver circuit, and/or the like) of the storage device, and may receive information of the external device from the external device.

According to the linkup state, the storage device may obtain the information of the connected external device (S130). For example, the storage device 1303a may recognize that an external device connected through the variable interface circuit 1338a is another storage device 1303b, and the storage device 1303c may recognize that an external device connected through the variable interface circuit 1338c is the main processor 1101. In some example embodiments, the storage device may recognize a type of an external device through an additional pin (e.g., a general purpose input/output (GPIO) pin) irrespective of the linkup state.

The storage device may select an operation mode of an interface circuit based on the information of the connected external device (S140). For example, the storage controller 1333a may control the variable interface circuit 1338a to operate in the switch operation mode in response to the connection to another storage device 1303b, and the storage controller 1333c may control the variable interface circuit 1338c to operate in the endpoint operation mode in response to the connection to the main processor 1101.

Figure 17:
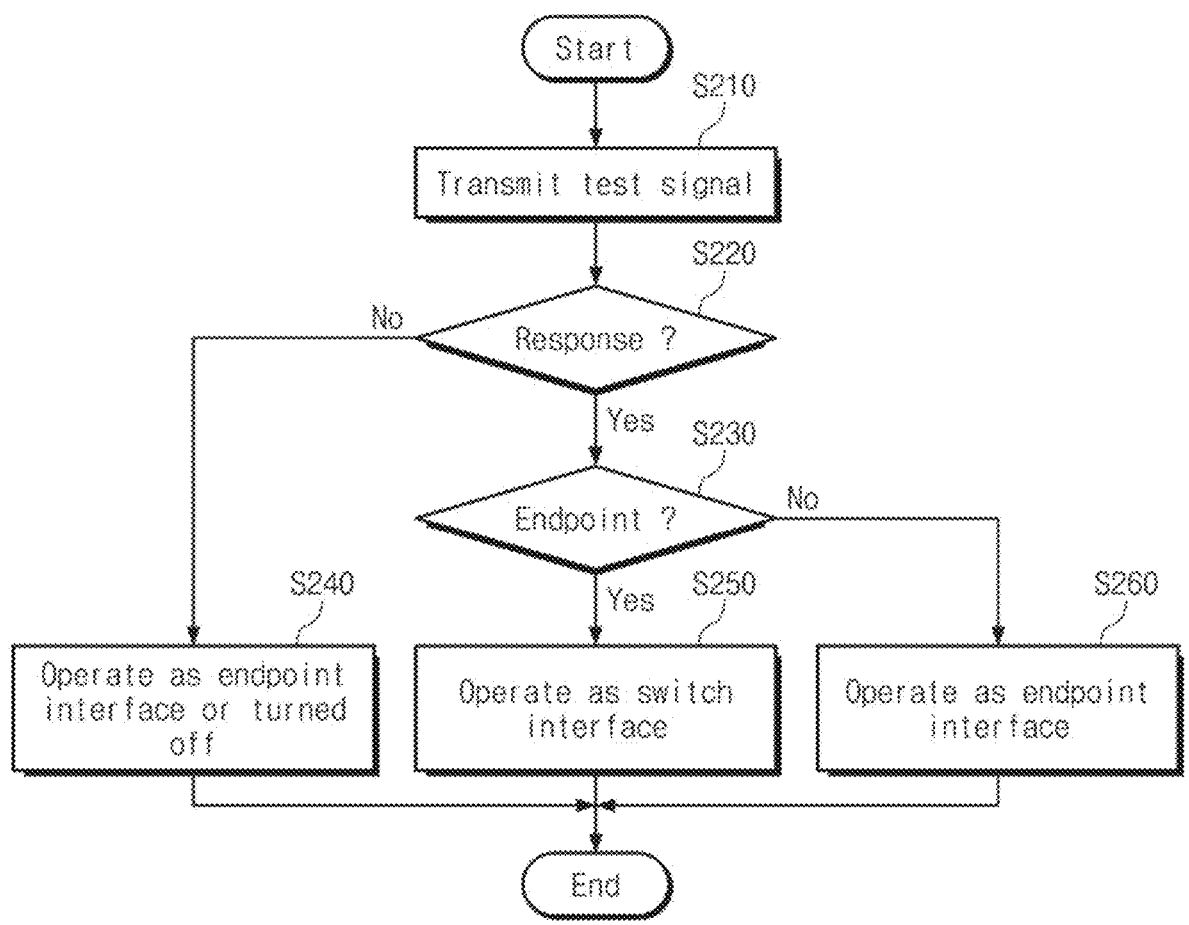

FIG. 17 is a flowchart describing an example operation of the variable interface circuit of FIG. 15.

For example, a variable interface circuit may first attempt to operate in the switch operation mode. In the attempted switch operation mode, the variable interface circuit may transmit a test signal (S210). The test signal may be configured to be suitable for identifying whether an external device is connected to the variable interface circuit and a type of the external device. For another example, the variable interface circuit may first attempt to operate in the endpoint operation mode and may transmit a test signal.

The variable interface circuit or a storage controller may determine whether a response corresponding to the test signal is received (S220). When the response is not received (No of S220), this may mean that the variable interface circuit is not connected to the external device. In this case, the variable interface circuit may operate in the endpoint operation mode or may be turned off (S240). The turn-off may mean a state where an intended function or operation is not performed without power being supplied.

When the response is received (Yes of S220), this may mean that the variable interface circuit is connected to the external device. For example, a response from an endpoint device (e.g., a storage device) may be implemented to be different from a response from a host (e.g., the main processor 1101). In this case, the variable interface circuit or the storage controller may determine a type of the external device corresponding to the response (e.g., may determine whether the response is associated with the endpoint device or with the host) (S230).

When the response is associated with the endpoint device (Yes of S230), the variable interface circuit may operate in the switch operation mode (S250). For example, the variable interface circuit 1338a may provide an operation of a root complex and/or a switch in the switch operation mode based on the response from the storage device 1303b.

When the response is associated with the host (No of S230), the variable interface circuit may operate in the endpoint operation mode (S260). For example, the variable interface circuit 1338c may support communication of the endpoint device in the endpoint operation mode based on the response from the main processor 1101.

Figure 18:
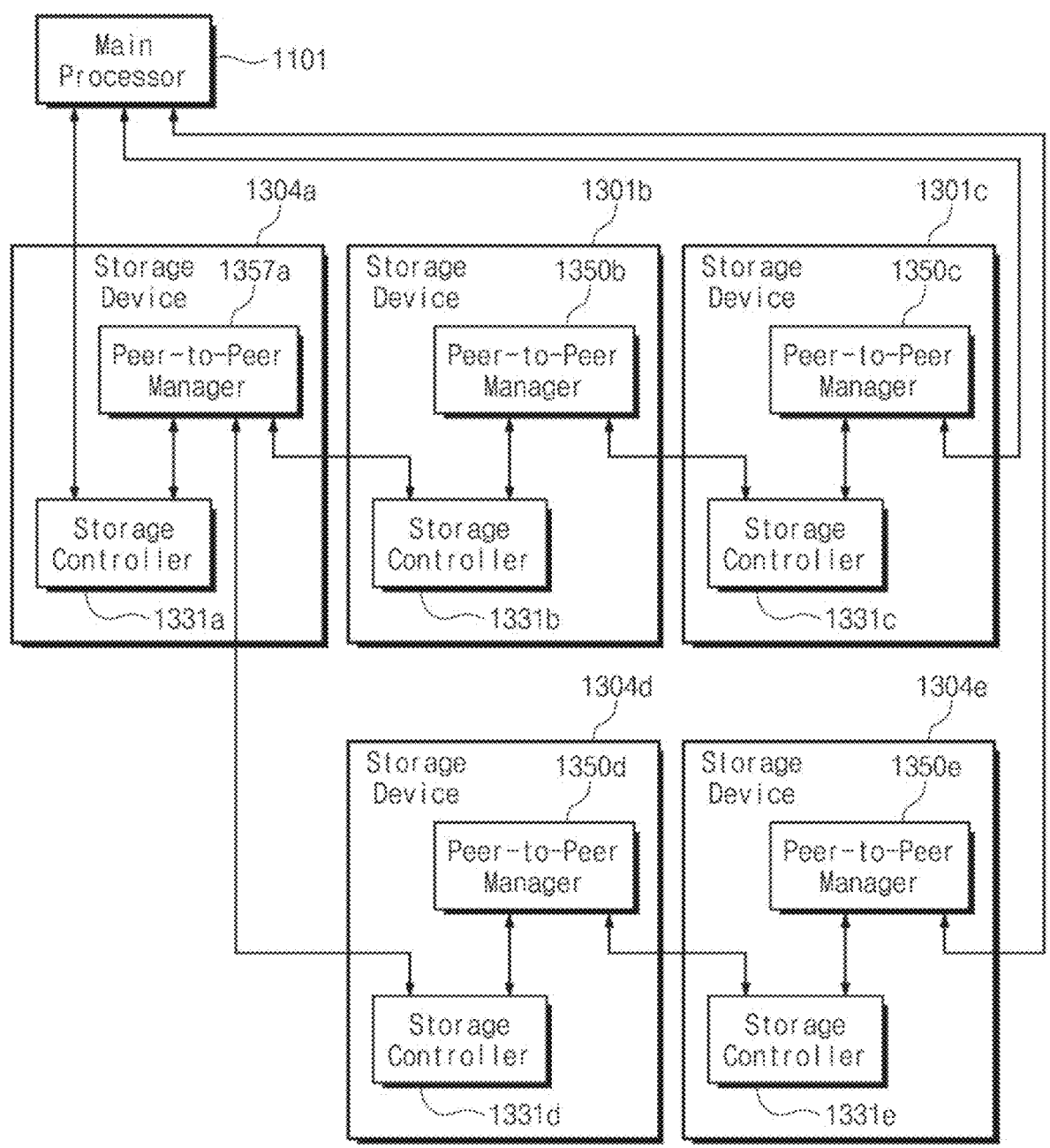
FIG. 18 is a block diagram illustrating an example configuration associated with storage devices of FIG. 1.

FIG. 18 is a block diagram illustrating an example configuration associated with the storage devices 1300a, 1300b, and 1300c of FIG. 1.

In some example embodiments, the storage devices 1300a, 1300b, and 1300c may include storage devices 1304a, 1301b, 1301c, 1304d, and 1304e. Similarly to the example configuration of FIG. 5, the storage devices 1304a, 1301b, and 1301c may be connected to each other and may communicate with each other in a peer-to-peer manner.

For example, a peer-to-peer manager 1357a may include three downstream ports. Two downstream ports of the three downstream ports may be connected to the storage controllers 1331a and 1331b, respectively. The other downstream port of the three downstream ports may be connected to a storage controller 1331d of the storage device 1304d.

Similarly to the connection between the storage devices 1304a, 1301b, 1301c, the storage devices 1304a, 1304d, and 1304e may be connected to each other and may communicate with each other in a peer-to-peer manner. A peer-to-peer manager 1350d may be connected to storage controllers 1331d and 1331e through two downstream ports. A peer-to-peer manager 1350e may be connected to the storage controller 1331e and the main processor 1101 through the two downstream ports.

The peer-to-peer managers 1357a, 1350b, 1350c, 1350d, and 1350e may manage a data flow, and may distributively perform an operation requested by the main processor 1101. It may be readily understood that connection between storage devices may be variously changed or modified depending on the number of downstream ports included in each peer-to-peer manager. Such change or modification may be similarly applied to the example configurations described with reference to FIGS. 13 to 15.

Figure 19:
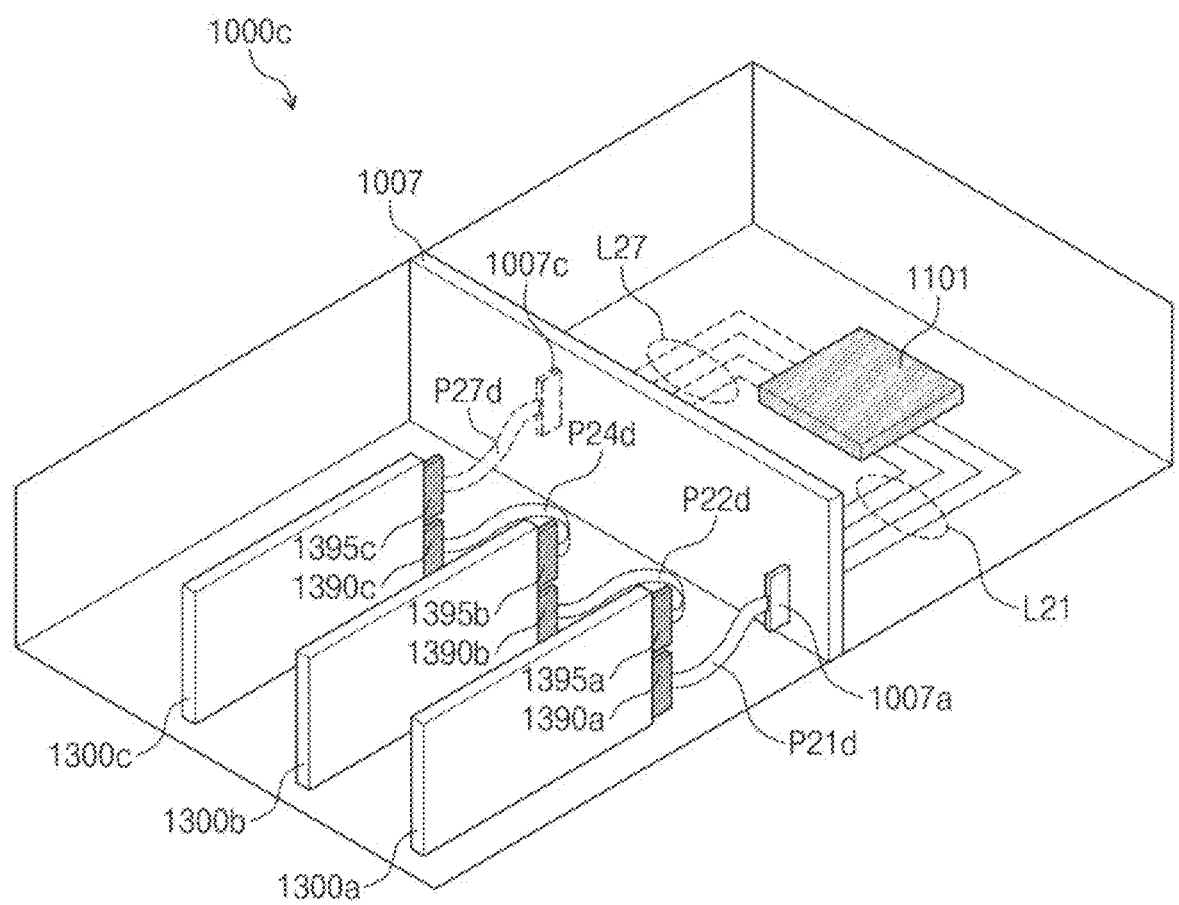
FIG. 19 is a conceptual diagram illustrating an example implementation associated with an electronic system of FIG. 1.

FIG. 19 is a conceptual diagram illustrating an example implementation associated with the electronic system 1000 of FIG. 1.

For example, the electronic system 1000 may be implemented in a server 1000c. The storage devices 1300a, 1300b, and 1300c may be implemented in a dual-port structure, and may be connected to or equipped in the server 1000c.

The connector 1390a of the storage device 1300a may be connected to a backplane 1007 through a cable P21d and a connector 1007a. FIG. 19 illustrates connection implemented through the cable P21d. However, in some example embodiments, the connector 1390a may be connected directly to the connector 1007a.

The connector 1395a of the storage device 1300a may be connected to a connector 1390b of the storage device 1300b through a cable P22d. A connector 1395b of the storage device 1300b may be connected to a connector 1390c of the storage device 1300c through a cable P24d. A connector 1395c of the storage device 1300c may be connected to the backplane 1007 through a cable P27d and a connector 1007c; in some example embodiments, the connector 1395c may not be connected to the backplane 1007.

In this manner, the storage devices 1300a, 1300b, and 1300c may communicate with each other in a peer-to-peer manner. Peer-to-peer connection between the storage devices 1300a, 1300b, and 1300c may be completely separated from the backplane 1007. Accordingly, the main processor 1101 may not intervene in communication between the storage devices 1300a, 1300b, and 1300c.

The main processor 1101 may be connected to the backplane 1007 through conductive lines L21, and thus may communicate with the storage device 1300a. The main processor 1101 may communicate with the storage device 1300c through conductive lines L27; in some cases, the conductive lines L27 may not be provided.

The above descriptions are intended to provide example configurations and operations for implementing the present disclosure. The present disclosure may include implementations which may be obtained by simply changing or modifying the above example embodiments, in addition to the above-described example embodiments. Also, the present disclosure may include implementations which may be accomplished by easily changing or modifying the above-described example embodiments in the future.

What is claimed is:

1. A storage device comprising:
a storage controller interposed between a first port of the storage device and a second port of the storage device; and
a memory device,
wherein the storage device is configured to, when the first port is connected to an external storage device, output first data to the external storage device through the first port without intervention of a host, the first data being generated based on at least one from among second data stored in the memory device and third data received through the second port.

2. The storage device of claim 1, wherein the first data is generated to be different from each of the second data and the third data.

3. The storage device of claim 1, further comprising a peer-to-peer manager configured to provide a path for transferring data in a peer-to-peer manner between the storage controller and the external storage device.

4. The storage device of claim 1, wherein the storage controller comprises:
a variable interface circuit connected to the first port, the variable interface circuit being configured to operate in a plurality of operation modes; and
an embedded operation logic circuit configured to generate the first data based on the at least one from among the second data and the third data.

5. The storage device of claim 3, wherein the peer-to-peer manager comprises:
an internal switch configured to manage a flow of the at least one from among the second data and the third data and a flow of the first data; and
an operation logic circuit configured to generate the first data based on the at least one from among the second data and the third data.

6. The storage device of claim 5, wherein a switch operation mode for supporting communication with the external storage device is one of the plurality of operation modes,
  wherein an endpoint operation mode for supporting operation of an end point device is one of the plurality of operation modes, and
  wherein the variable interface circuit is configured to:
    operate in the switch operation mode when the first port is connected to the external storage device, and
    operate in the endpoint operation mode when the first port is connected to the host.

7. A storage system comprising:
  a first storage device comprising a first port and a second port; and
  a second storage device comprising a third port,
  wherein the second port is connected to the third port, and the first storage device is configured to communicate with the second storage device through the second port and the third port without intervention of a host,
  wherein the first storage device is configured to output first data through the second port based on at least one data of second data received through the first port and third data stored in the first storage device,
  wherein the second storage device is configured to generate fourth data based on at least one from among the first data received through the third port and fifth data stored in the second storage device, and
  wherein an operation result corresponding to a request of the host is provided to the host based on the fourth data.

8. The storage system of claim 7, wherein the operation result is generated distributively from the first storage device and the second storage device based on an operation requested by the host.

9. The storage system of claim 7, wherein the second storage device further comprises a fourth port which is not connected to the first storage device,
  wherein each of the first port and the fourth port is configured to be connected to the host,
  wherein the first storage device is configured to receive the request through the first port from the host, and
  wherein the second storage device is configured to output the operation result to the host through the fourth port based on the fourth data.

10. The storage system of claim 7, wherein the second storage device is configured to transmit the operation result to the first storage device through the third port and the second port, and
  wherein the first storage device is configured to output the operation result received from the second storage device to the host through the first port.

* * * * *